US006772415B1

(12) United States Patent
Danckaert et al.

(10) Patent No.: US 6,772,415 B1
(45) Date of Patent: Aug. 3, 2004

(54) LOOP OPTIMIZATION WITH MAPPING CODE ON AN ARCHITECTURE

(75) Inventors: Koen Danckaert, Asse (BE); Francky Catthoor, Temse (BE)

(73) Assignee: Interuniversitair Microelektronica Centrum (IMEC) vzw, Leuven (BE)

(*) Notice: Subject to any disclaimer, the term of this patent is extended or adjusted under 35 U.S.C. 154(b) by 0 days.

(21) Appl. No.: 09/495,437

(22) Filed: Jan. 31, 2000

(51) Int. Cl.[7] ............................................. G06F 9/44
(52) U.S. Cl. ..................................... 717/161; 712/241
(58) Field of Search ................................. 717/160, 161, 717/151; 712/241

(56) References Cited

U.S. PATENT DOCUMENTS

| | | | | |
|---|---|---|---|---|
| 6,286,135 B1 | * | 9/2001 | Santhanam | 717/146 |
| 6,374,403 B1 | * | 4/2002 | Darte et al. | 717/161 |
| 6,438,747 B1 | * | 8/2002 | Schreiber et al. | 717/160 |
| 6,687,807 B1 | * | 2/2004 | Damron | 712/205 |

OTHER PUBLICATIONS

"Compiler Transformations for High–Performance Computing", D.F.Bacon et al, ACM Computing Surveys, Vol 26, No 4, Dec. 1994 pp. 345–420.*
"Optimization of Data/Control Conditions in Task Graphs" M. Girkar et al. pp. 152–168, 1990s.*
S. Amarasinghe, et al., "An Overview of the SUIF Compiler for Scalable Parellel Machines", Proc. Of the 7th SIAM Conf. On Parallel Proc. For Scientific Computing, 1995.
C. Ancourt, et al., "Automatic Data Mapping of Signal Processing Applications", Proc. Intnl. Conf. On Applic-.–Spec. Array Processors, Zurich, Switzerland, pp. 350–363, Jul. 1997.
J. Anderson, et al., "Data and Computing Transformation for Multiprocessors", in 5th ACM SIGPLAN Symposium on Principles and Practice of Parallel Programming, pp. 39–50, Aug. 1995.
M. Cierniak, et al., "Unifying Data and Control Transformation for Distributed Shared–Memory Machines", Proc. Of the SIGPLAN '95 Conference on Programming Language Design and Implementation, La Jolla, pp. 205–217, Feb. 1995.
K. Danckaert, et al., "Platform Independent Data Transfer and Storage Exploration Illustrated on a Parallel Cavity Detection Algorithm", Proc. CSREA Conference on PAR. And Dist. Proc. Techniques and Applications, vol. 3, pp. 1669–1675, Las Vegas, NV, USA, Jun. 1999.

K. Danckaert et al., "Strategy for Power–Efficient Design of Parallel Systems", IEEE Trans. On Parallel and Distributed Systems, vol. 7, No. 11, pp. 1150–1163, Nov. 1996.
C. Diderich, et al., "Solving the Constant–Degree Parallelism Alignment Problem", Proc. EuroPar Conference, Lyon, France, Aug. 1996. Lecture notes in Computer Science, Spring Verlag, pp. 451–454, 1996.
M. Dion, et al., "Mapping Affine Loop Nests: New Results", Lecture Notes in Computer Science, vol. 919, High Performance Computing and Networking, pp. 184–189, 1995.
J.Z. Fang, et al., "An Iteration Partition Approach for Cache of Local Memory Thrashing on parallel Processing", IEEE Trans. On Computers, vol. C–42, No. 5, pp. 529–546, May 1993.
F. H. M. Franssen, et al., "Modeling Multidimensional Data and Control Flow", IEEE Trans. On VLSI Systems, vol. 1, No. 3, pp. 319–327, Sep. 1993.
M. Lam, et al., "The Cache Performance and Optimizations of Blocked Algorithms", In Proc. ASPLOS–IV, pp. 63–74, Santa Clara, CA 1991.
L. Lamport, "The Parallel Execution of DO Loops", Communications of the ACM, vol. 17, No. 2, pp. 83–93, Feb. 1974.
K. McKinley, "A Compiler Optimization Algorithm for Shared–Memory Multiprocessors", IEEE Trans. On Parallel and Distributed Systems, vol. 9, No. 8, Aug. 1998.
P.R. Panda, et al., "Memory Data Organization for Improved Cache Performance in Embedded Processor Applications", In Proc. ISSS–96, pp. 90–95, La Jolla, CA 1996.
N.L. Passos, et al., "Achieving Full Parallelism Using Multidimensional Retiming", IEEE Trans. On Parallel and Distributed Systems, vol. 7, No. 11, Nov. 1996.
K. Pettis, et al., "Profile Guided Code Positioning", In ACM SIGPLAN '90 Conference on Programming Language and Design Implementation, pp. 16–27, Jun. 1990.
W. Shang, et al., "On Uniformization of Affine Dependence Algorithms", IEEE Trans. On Computers, vol. 46, No. 7, Jul. 1996.
M. E. Wolf, et al., "A Loop Transformation Theory and an Algorithm to Maximize Parallelism", IEEE Trans. On Parallel and Distributed Systems, vol. 2, No. 4, Oct. 1991.

* cited by examiner

*Primary Examiner*—Todd Ingberg
(74) *Attorney, Agent, or Firm*—Knobbe, Martens, Olson & Bear, LLP

(57) ABSTRACT

A loop transformation step, to be performed on code and improving data transfer and storage, while executing said transformed code on a parallel processor, is disclosed. Improval of the data locality and regularity of the algorithm, described by said code, is aimed at. Said loop transformation step works globally and is feasible for realistic code sizes.

47 Claims, 28 Drawing Sheets

```
C:(l:1..N)::
  (k:1..N)::
    b[k][l+1] = g( b[k][l] );

B:(p:1..N)::
  b[p][1] = f( a[N-p+1][p], a[N-p][p] );

A:(i:1..N)::
  (j:1..N-i+1)::
    a[i][j] = in[i][j]+a[i-1][j];
```

```
for(i=1; i<=N+2; ++i){
  for(j=1; j<=N-i+1; ++j)
    a[i][j] = in[i][j]+a[i-1][j];
  if(...)b[N-i+2][1] = f(a[i-1][N-i+2],
                         a[i-2][N-i+2]);
  for(k=N-i+3; k<=N; ++k)
    b[k][i+k-N-1] = g(b[k][i+k-N-2]);
}
```
FIG. 14
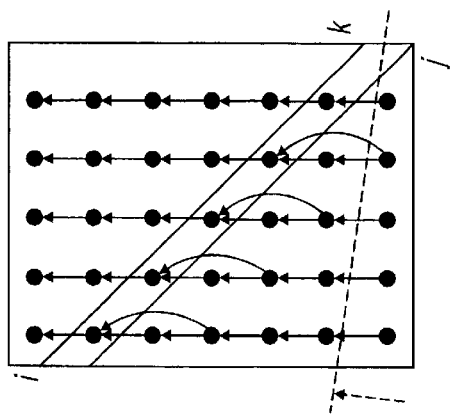
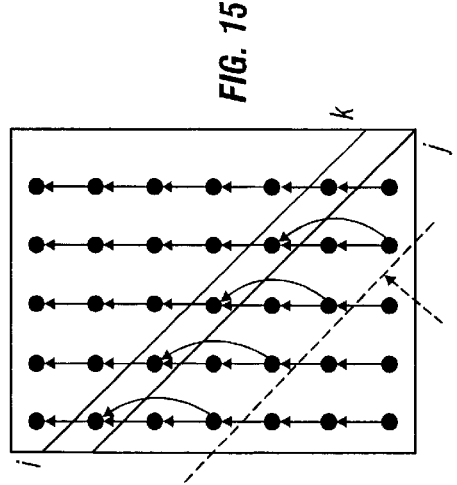
FIG. 15

```
for(j=1; j<=N; ++j){
  for(i=1; i<=N-j+1; ++i)
    a[i][j]= in[i][j]+a[i-1][j];
  b[j][1] = f(a[N-j+1][j],a[N-j][j]);
  for(l=1; l<=j; ++l)
    b[j][l+1] = g(b[j][l]);
}
```
FIG. 16
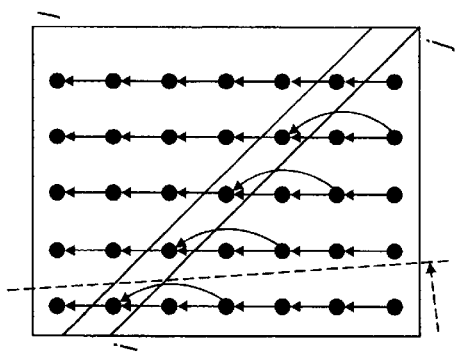
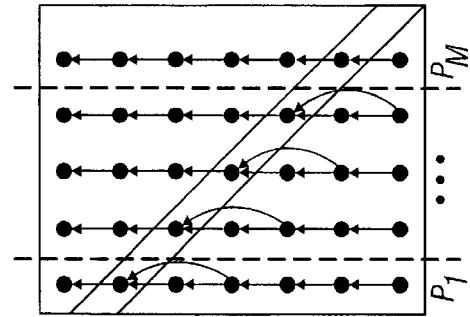
FIG. 17

Longer extreme and shorter average dependency length

Shorter extreme and longer average dependency length

A CRE is defined here as a 6-tuple:

$$<D_k, f_k, U_k, V_k, I_k, J_k>$$

where:

- k is the identification number of the CRE.

- $D_k = \{x \in Z^{n_k} | C_k x \geq c_k\}$ is the domain over which the CRE is defined.

- $f_k$ is the operation performed by the CRE.

- $U_k$ is the signal being defined by the CRE.

- $V_k = \{V_k^i\}$ is the set of operand signals of the CRE.

- $I_k$ is the index function for the signal being defined $U_k$.

- $T_k = \{J_k^i\}$ are the index functions for the operands $V_k$.

The signal $U_k$ is thus defined as:

$$U_k(I_k(x)) = f_k(..., V_k^i(J_k^i(x)), ...)$$

When the CRE is affine, the index functions can be written as:

$$\{x \in Z^{n1} \mid C_1 x \geq c_1\} : U_1(I_1(x)) = f_1(...)$$
$$\{x \in Z^{n2} \mid C_2 x \geq c_2\} : U_2(I_2(x)) = f_2(U_1(J_2^1(x)))$$

$$I_1(x_1) = J_2^1(x_2)$$
$$C_1 x_1 \geq c_1$$
$$C_2 x_2 \geq c_2$$
$$x_1 \in Z^{n_1}$$
$$x_2 \in Z^{n_2}$$

```
(i: 0 .. N)::              (i: 0 .. N)::
begin                      begin
  C[i] = f(A[i]);            D[i] = fg(A[i]);
  D[i] = g(C[i]);          end;
end;
```

```
(i:: 0 .. N-1)::
(j:: 0 .. M-1)::
  read(image[i][j]);

(i:: 0 .. N div 2-1)::
(j:: 0 .. M div 2-1)::
begin
  temp[i][j][0] = 0;
  (k:: 0 .. 1)::
  (l:: 0 .. 1)::
    temp[i][j][2*k+l+1] = temp[i][j][2*k+l] + image[2*i+k][2*j+l];
  sub2[i][j] = temp[i][j][4]/4;
end;
```

FIG. 37

```
(i:: 0 .. N-1)::
(j:: 0 .. M-1)::
  read(image[i][j]);

(i:: 0 .. N div 2-1)::
(j:: 0 .. M div 2-1)::
begin
  temp[i][j][0] = 0;
  temp[i][j][1] = temp [i][j][0] + image[2*i][2*j];
  temp[i][j][2] = temp [i][j][1] + image[2*i][2*j+1];
  temp[i][j][3] = temp [i][j][2] + image[2*i+1][2*j];
  temp[i][j][4] = temp [i][j][3] + image[2*i+1][2*j+1];
  sub2[i][j] = temp[i][j][4]/4;
end;
```

FIG. 38

```
(i: 0 .. N-1) ::
(j: 0 .. M-1) ::
    read(image[i][j]);
```

FIG. 39

```
(i: 0 .. N div 2-1) ::
(j: 0 .. M div 2-1) ::
    sub2[i][j] = avg4(image[2*i][2*j], ... , image[2*i+1][2*j+1]);
end;
```

```
(i: 0 .. N-1) ::
    read(line[i]);

(i: 0 .. N div 2-1) ::
begin
    temp2[i][0] = 0;
    (k: 0 .. 1) ::
        temp2[i][k+1] = temp2[i][k] + line[2*i+k];
    sub2[i] = temp2[i][2]/2;
end;

(i: 0 .. N div 4-1) ::
begin
    temp4[i][0] = 0;
    (k: 0 .. 3) ::
        temp4[i][k+1] = temp4[i][k] + line[4*i+k];
    sub[i] = temp4[i][4]/4;
end;
```

FIG. 40

```
(i: 0 .. N-1)::
read(line[i]);

(i: 0 .. N-1 :: 2)::
begin
  temp2[i div 2][0] = 0;
  (k: 0 .. 1)::
    temp2[i div 2][k+1] = temp2[i div 2][k] + line[i+k];
  sub2[i div 2] = temp2[i div 2][2]/2;
end;

(i: 0 .. N-1 :: 4)::
begin
  temp4[i div 4][0] = 0;
  (k: 0 .. 3)::
    temp4[i div 4][k+1] = temp4[i div 4][k] + line[i+k];
  sub[i div 4] = temp4[i div 4][4]/4;
end;
```

FIG. 41

```
(i: 0 .. N-1)::
read(line[i]);

(i: 2 .. N+1 : 2)::
begin
  temp2[(i-2) div 2][0] = 0;
  (k: 0 .. 1)::
    temp2[(i-2) div 2][k+1] = temp2[i div 2][k] + line[i-2+k];
  sub2[(i-2) div 2] = temp2[(i-2) div 2][2]/2;
end;

(i: 4 .. N+3 : 4)::
begin
  temp4[(i-4) div 4][0] = 0;
  (k: 0 .. 3)::
    temp4[(i-4) div 4][k+1] = temp4[(i-4) div 4][k] + line[i-4+k];
  sub4[(i-4) div 4] = temp4[(i-4) div 4][4]/4;
end;
```

FIG. 42

```
(i: 0 .. N+3) ::
begin
  if (i<N)
    read(line[i]);

if ((i>=2) && (i<N+2) && (i mod 2==0))
  begin
    temp2[(i-2) div 2][0] = 0;
    (k: 0 .. 1) ::
      temp2[(i-2) div 2][k+1] = temp2[i div 2][k] + line[i-2+k];
    sub2[(i-2) div 2] = temp2[(i-2) div 2][2]/2;
  end;

if ((i>=4) && (i mod 4==0))
  begin
    temp4[(i-4) div 4][0] = 0;
    (k: 0 .. 3) ::
      temp4[(i-4) div 4][k+1] = temp4[(i-4) div 4][k] + line[i-4+k];
    sub4[(i-4) div 4] = temp4[(i-4) div 4][4]/4;
  end;
end;
```

FIG. 43

```
(i: 0 .. N div 4-1) ::
begin
  read(line[4*i]); read(line[4*i+1]);
  read(line[4*i+2]); read(line[4*i+3]);
end;

(i: 0 .. N div 4-1) ::
begin
  temp2[2*i][0] = 0;
  (k: 0 .. 1) ::
    temp2[2*i][k+1] = temp2[2*i][k] + line[4*i+k];
  sub2[2*i] = temp2[2*i][2]/2
  temp2[2*i+1][0] = 0;
  (k: 0 .. 1) ::
    temp2[2*i+1][k+1] = temp2[2*i+1][k] + line[4*i+2+k];
  sub2[2*i+1] = temp2[2*i+1][2]/2
end;

(i: 0 .. N div 4-1) ::
begin
  temp4[i][0] = 0;
  (k: 0 .. 3) ::
    temp4[i][k+1] = temp4[i][k] + line[4*i+k];
  sub4[i] = temp4[i][4]/4;
end;
```

FIG. 44

```
(i: 0 .. N div 4-1) ::
begin
  read(line[4*l]); read(line[4*i+1]); read(line[4*i+2]); read(line[4*i+3]);
  temp2[2*i][0] = 0;
  (k: 0 .. 1) ::
    temp2[2*i][k+1] = temp2[2*i][k] + line[4*i+2+k];
  sub2[2*i] = temp2[2*i][2]/2;
  temp2[2*i+1][0] = 0;
  (k: 0 .. 1) ::
    temp2[2*i+1][k+1] = temp2[2*i+1][k] + line[4*i+2+k];
  sub2[2*i+1] = temp2[2*i+1][2]/2
  temp4[i][0] = 0;
  (k: 0 .. 3) ::
    temp4[i][k+1] = temp4[i][k] + line[4*i+k];
  sub4[i] = temp4[i][4]/4;
end;
```

FIG. 45

LOOP OPTIMIZATION WITH MAPPING CODE ON AN ARCHITECTURE

FIELD OF THE INVENTION

The invention relates to methods and environments for mapping source code on a target architecture, preferably a parallel architecture.

BACKGROUND OF THE INVENTION

Before actual mapping of source code on a target architecture, one often transforms the original first code into a second code, because one expects the execution of said second code on said architecture to be better. Said source code often comprises loops and loop nests. Part of said code transformations are loop transformations, which are the topic of research in many papers and publications.

Said source codes typically have a lot of loops and loop nests. For data transfer and storage optimization, it is essential that global loop transformations are performed, over artificial boundaries between subsystems (procedures). It is exactly at these boundaries that the largest memory buffers are usually needed [K.Danckaert, K.Masselos, F.Catthoor, H.De Man, C.Goutis, Strategy for power efficient design of parallel systems, IEEE Trans. on VLSI Systems}, Vol.7, No.2, pp.258–265, June 1999.]. To optimize these buffers, global (inter-procedural) transformations are necessary. Most existing transformation techniques can only be applied locally, to one procedure or even one loop nest [N.Passos, E.Sha, Achieving full parallelism using multidimensional retiming, IEEE Trans. on Parallel and Distributed Systems, Vol.7, No.11, pp.1150–1163, November 1996.].

Most existing transformation methods assume that there is a dependency between two statements which access the same memory location when at least one of these accesses is a write [W.Shang, E.Hodzic, Z.Chen, On uniformization of affine dependence algorithms, IEEE Trans. on Computers, Vol.45, No.7, pp.827–839, July 1996.]. In this way, output-, anti- and flow-dependencies are all considered as real dependencies.

As for parallel target architectures, the previously applied compiler techniques tackle the parallelization and load balancing issues as the only key point. [S.Amarasinghe, J.Anderson, M.Lam, and C.Tseng, The SUIF compiler for scalable parallel machines, Proc. of the 7th SIAM Conf. on Parallel Proc. for Scientific Computing}, 1995.]. They ignore the global data transfer and storage related cost when applied on data dominated applications like multi-media systems. Only speed is optimized and not the power or memory size. The data communication between processors is usually taken into account in most recent methods [C.Diderich, M.Gengler, Solving the constant-degree parallelism alignment problem, Proc. EuroPar Conference, Lyon, France, August 1996. Lecture notes in computer science, series, Springer Verlag, pp.451–454, 1996.] but they use an abstract model (i.e. a virtual processor grid, which has no relation with the final number of processors and memories). In this abstract model, the real (physical) data transfer costs cannot be taken into account.

To adequately express and optimize the global data transfers in an algorithm, an exact and concise modeling of all dependencies is necessary. The techniques which are currently used in compilers do not use an exact modeling of the dependencies, but an approximation in the form of direction vectors or an extension of this (see [M.Wolf, M.Lam, A loop transformation theory and an algorithm to maximize parallelism, IEEE Trans. on Parallel and Distributed Systems, Vol.2, No.4, pp.452–471, October 1991.] for a detailed description). An example is [K.McKinley, A compiler optimization algorithm for shared-memory multiprocessors, IEEE Trans. on Parallel and Distributed Systems, Vol.9, No.8, pp.769–787, August 1998.], which combines data locality optimization and advanced interprocedural parallelization. However, it does not use an exact modeling, and as a result it cannot analyze the global data-flow.

Many techniques have been developed using an exact modeling, but these have not led to real compilers. The first method which used an exact modeling was the hyperplane method L.Lamport, The parallel execution of do loops, Communications of the ACM, Vol.17, No.2, pp.83–93, February 1974., where a linear ordering vector is proposed to achieve optimal parallelism. It works only for uniform loop nests, and all statements in the loop nest are considered as a whole: they all get the same ordering vector. Some particular cases of the hyperplane method have been proposed too. For example, selective shrinking and true dependence shrinking are in fact special cases of the hyperplane method, in which a particular scheduling vector is proposed.

Often a linear programming method is proposed to determine the optimal scheduling vector for the hyperplane method. Extensions where all statements of a loop nest are scheduled separately are called affine-by-statement scheduling. In [M.Dion, Y.Robert, Mapping affine loop nests: new results, Lecture Notes in Computer Science, Vol.919, High-Performance Computing and Networking, pp.184–189, 1995.], a further extension is considered, namely for affine dependences. These methods are mainly theoretical: the ILP's to solve get too complicated for real world programs. Moreover they are designed only to optimize parallelism, and they neglect the data reuse and locality optimization problem.

Some papers have addressed the optimization of algorithms using the polytope model however these methods are quite complex and not suitable for models in the order of hundreds of polytopes.

AIM OF THE INVENTION

It is an aim of the invention to provide methods for transforming source code with loop transformations which focus on global data storage and transfer issues in parallel processors and which are feasible for realistic real-world data dominant codes.

SUMMARY OF THE INVENTION

In a first aspect of the invention a method (3) for transforming a first code (1) to a second code (2) is disclosed. Said first code and said second code describe at least the same functionality. Said first code and said second code are executable on a predetermined target architecture (4). The invented method transforms said first code into said second code, such that said target architecture can deliver said functionality while executing said code in a more cost optimal way. Said cost can relate to energy consumption of said target architecture but is not limited thereto. Said target architecture comprises at least two processors (5) and at least three levels of storage (6). Said target architecture can be denoted to be a parallel architecture. Each level comprises of storage units, wherein variables or signals, defined in said codes can be stored. Said levels define a hierarchy between storage units. Storage units in a first level are denoted local storage units. Storage units in the second level are less local than the ones in said first level. Storage units in a level N are less local than the ones in Level N−1, N−2, . . . and said first level. Storage units in the highest level are denoted global storage units. Said invented method transforms said codes in order to optimize transfers in between said storage levels, meaning that data transfers between lower level storage units are preferred for optimality. The method thus improves at least the data locality. In each of said processors at least two storage levels can be found. The characteristics of said storage levels within a processor can be considered to be part of internal processor characteristics information. The invented method is characterized in that it exploits such internal processor characteristics information explicitly while transforming said first code into said second code. Said codes considered in the invented method is characterized in that it contains a least of a plurality of loop nests. While transforming said first into said second code said loop nests in said codes are considered simultaneously. While transforming said first code in said second code, said loop nests are taken into account globally, meaning said transformation does not work step-by-step wise, wherein in each step a loop nest is taken into account. Instead the invention considers a substantial subset of said loop nests, meaning at least two loop nests.

The invention can thus be formalized as a method for transforming a first code, being executable on a predetermined parallel architecture, to a second code, being executable on said predetermined parallel, said first code and said second code describing the same functionality. Said predetermined architecture comprises at least two processors and three storage levels, at least two storage levels, being within each of said processors. Said first code comprising at least two loop nests. Said method comprising the steps of: loading said first code; loading internal processor characteristics information of said processors; transforming said first code into said second code, in order to optimize an optimization function, related to at least data locality; said transformation taking into account at least two of said loop nests; said transformation exploiting said internal processor characteristics information of said processor. Said transformation takes into account a substantial subset of said loop nests.

Loop nests in code can be described by their iterators and their iterator space, being the values that said iterators can take while said code is executed. Within each loop nests operations are performed. Said operations use, consume or read variables or signals. For each execution of an operations the variables exploited depends on the values of the iterators of the related loop nest while executing said operation. Said operators also produce new values, to be stored in variables. In which variable said values are stored depends also on the values of the iterators of the related loop nest while executing said operation. When variables produced in a loop nest are consumed in another loop nest a dependency between loop nests is found. More in particular dependencies between points in the iterator space of a first loop and points in the iterator space of a second loop can be defined. In a geometric representation with each combination of iterators of a loop a point in said loops iteration space is associated. A dependency is in such geometric representation associated with an arrow from such a point of a first loop, performing production of values, to a point of a second loop, performing consumption of values. The set of arrows, associated with the loop nest dependencies, defines a pattern. The transforming step of the invented method, comprises of two steps: a so-called placement step and a so-called loop ordering step. In said placement step, the iteration spaces of the individual loop nests found in said first code are grouped in a global iteration space. Said placement is performed such that the pattern defined by the loop nest dependency arrows in said global iteration space, shows at least improved regularity. It is clear that due to the nature of said placement step, information of said loop nests is exploited simultaneously. Said placement is also performed such that dependencies are made shorter. Measures for regularity and distance measures for data locality are presented in the invention.

The method can thus further be described as the method described above wherein said transformation step comprises: associating with said loop nests an iterator space with operations; determining loop nest dependencies; grouping said loop nest iterator spaces in one global iterator space; said grouping optimizing the regularity of the pattern defined by said dependencies in said global iterator space. Alternatively the invented method is described as the method describe above, wherein said transformation step comprises: associating with said loop nests an iterator space with operations; determining loop nest dependencies; grouping said loop nest iterator spaces in one global iterator space; said grouping shortening the dependencies. Naturally a combination of improving regularity and dependency shortening can be done also.

In the invented method after said placement step, a so-called loop ordering step is performed. Said loop ordering step exploit said global iterator space and thus information of the loop nests in said code is taken into account simultaneously. The loop ordering step can be performed by using e.g conventional space-time mapping techniques on said global iterator space, although the invention is not limited hereto. In the invented method space-time mapping techniques, which are adapted for taking into account data reuse possibilities and/or which take into account said internal processor characteristics or information, are presented. Each operation in said iteration space is assigned to one of said processors of said architecture and for each of said operation in said iteration space the time on which said operation will be executed is determined. Ones said assignment or space-time mapping is performed, code can be produced which is associated with the found space-time or processor-time mapping, meaning that when said code is executed on said architecture, said operations are executed on the assigned processor and at the assigned time instance. Said produced code is said second code.

The method described above, can thus further comprise the steps of: assigning a processor and an execution time to each operation in said global iterator space, thereby defining a processor-time mapping, said assigning resulting in optimizing an optimization function, related to data locality; determining said second code, being associated with said processor-time mapping.

In the invented method in either one or both of said placement or loop ordering step data reuse estimates can be exploited. It can be stated that the method described above is exploiting data reuse estimates while grouping or alternatively the method described above is exploiting data reuse estimates while assigning.

After applying the invented code transformation method, the transformed code or second code can then be mapped on processors, thereby exploiting a parallel compiler, customly designed or available programmable software processors, which show characteristics which are substantially similar to the characteristics of the target architecture used in the code transformation. The closer the processor characteristics are resembling the target architecture characteristics, the better the execution of said transformation code, in terms of data transfer and storage costs, will be. Naturally the invented code transformation method can be automated. In the invented method the target architecture model considers the real processors on which the algorithm has to be mapped, and even the real memory hierarchies available in these processors. Especially in the ordering step this information is exploited.

It must be emphasized that the invented transformation strategy is a part of a data transfer and storage methodology, which means that the main goal is not optimizing speed, but optimizing data storage and transfers. Because the performance in current microprocessors is largely determined by the ability to optimally exploit the memory hierarchy, represented here as storage levels, and the limited system bus bandwidth, the invented methodology leads also to an improved speed.

The invented method exploits exact modeling of the algorithms. The placement and ordering step is in the invented method clearly uncoupled and even exploit different cost functions. An important feature of the invented method is that global loop transformations are performed on code or code parts with at least two procedures or with at least two loop nests. In the invention a PDG model of the source code is used. Such PDG model provides an exact and concise modeling of all dependencies in the algorithm, and thus enables expressing and optimizing global data transfers.

The fact that the loop reordering step is split in at least two totally separate phases (placement, ordering) is characteristic for the invention. During the first phase (placement), the polytopes, being a geometric representation of loop nests, are mapped to an abstract space, with no fixed ordering of the dimensions. During the second phase (ordering), an ordering vector in that abstract space is defined. The advantage is that each of these phases is less complex than the original problem, and that separate cost functions can be used in each of the phases. This is crucial for the target domain, because global optimizations on e.g. MPEG-4 code involve in the order of hundreds of polytopes, even after pruning. Note that in an embodiment of the invention in between said placement and ordering step said partitioning step is done.

The invented method works on code in single assignment style. By converting the code to single assignment, only the flow dependencies are kept (i.e. when the first access is a write and the second one is a read). Indeed, only these dependencies correspond to real data flow dependencies, and only these should constrain the transformations to be executed on the code. Converting the code to single assignment, will of course increase the needed storage size at first, but during the in-place mapping stage, the data will be compacted again in memory, and usually in a more efficient way than was the case in the initial algorithm.

BRIEF DESCRIPTION OF THE DRAWINGS

FIG. 14 shows a first possible ordering in the common iteration space of FIG. 13.

FIG. 15 shows a second possible ordering in the common iteration space of FIG. 13.

FIG. 16 shows a third possible ordering in the common iteration space of FIG. 13.

FIG. 17 shows a possible processor mapping in the common iteration space of FIG. 13 and compatible with the ordering of FIG. 16.

FIG. 29 shows a formal definition of CRE's.

FIG. 30 shows a formal definition of a dependency function.

FIG. 31 shows as an example two recurrence equations.

FIG. 32 shows a dependency function, determined for the example of FIG. 33.

FIG. 33 shows for the example of FIG. 31, the formal representation of how to determine dependencies.

FIG. 34, shows an initial specification.

FIGS. 35–45 show code examples showing potential complexity reductions.

DETAILED DESCRIPTION OF THE INVENTION

Figure 1:
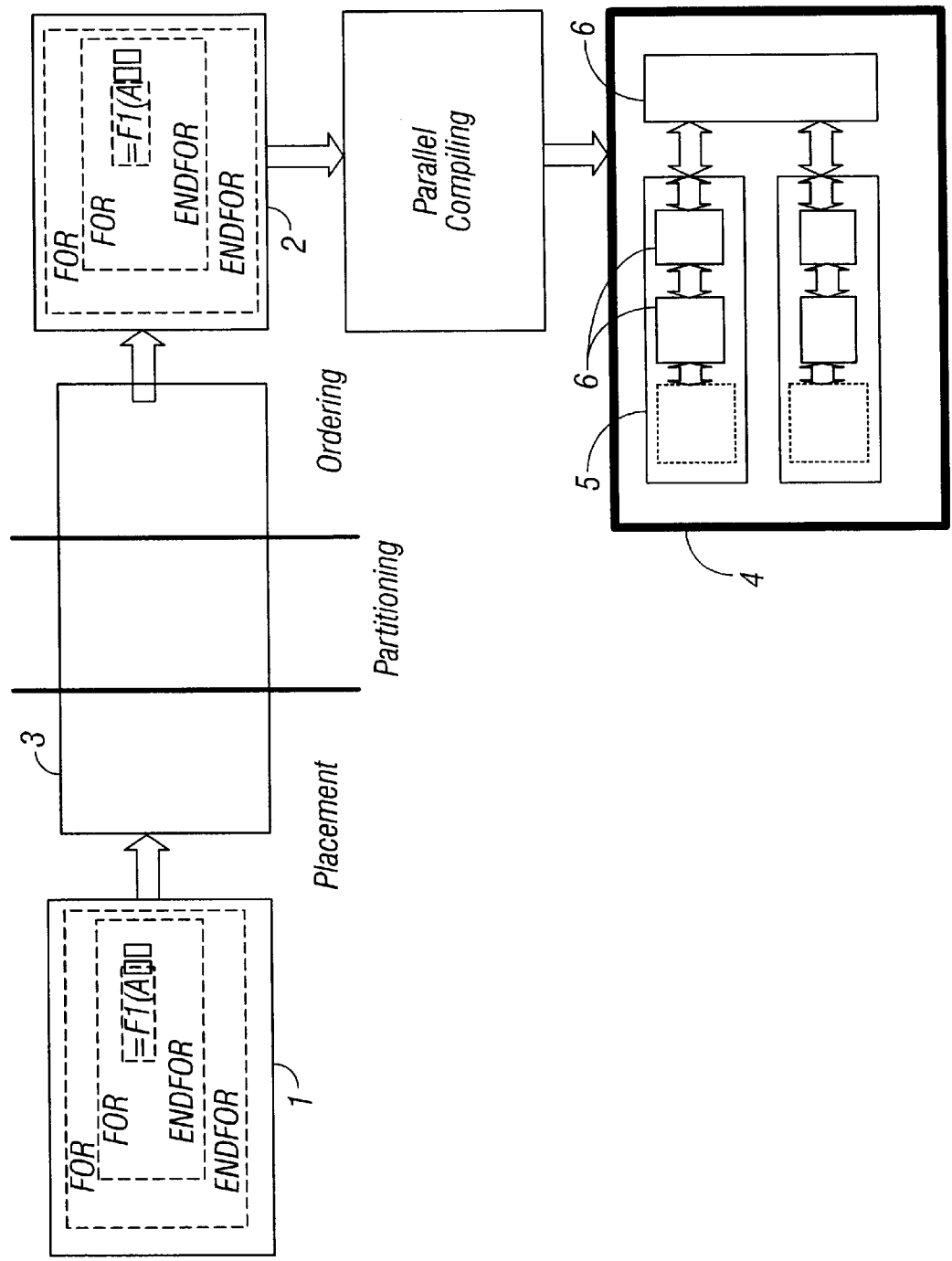
FIG. 1 shows a schematic view of the invention, being a method (3) or an environment incorporating said method, wherein a first code (1), being transformed in a second code (2). Said method comprises of at least two consecutive steps of placement and ordering. In an embodiment a further partitioning step between said placement and ordering is considered. Said second code can be further mapped with, for instance, existing parallel compilers, on pre-existing programmable processors or even to be designed architectures. Characteristic for the target architecture considered in the invention is that said architecture comprise of at least two processors, and has at least three storage levels, with two of these storage levels, being within said processors. Said invented method exploits geometric measures for optimizing said first code.

A method for transforming a first code to a second code is disclosed. Said first code and said second code describe at least the same functionality. Said first code and said second code are executable on a predetermined target architecture. The invented method transforms said first code into said second code, such that said target architecture can deliver said functionality while executing said code in a more cost optimal way. Said cost can relate to energy consumption of said target architecture but is not limited thereto.

The transformations to be applied on said codes are loop transformations. Said loop transformations heavily influence the data transfer and storage in said target architecture, meaning they are able to significantly reduce the required amount of storage and transfers. One can before applying loop transformations, do some pruning and data-flow transformations on said first code. As such however, they only increase the locality and regularity of the code. This enables later steps of the mapping of said code to processors (notably the data reuse, memory (hierarchy) assignment and in-place mapping steps) to arrive at the desired reduction of storage and transfers. The invented code transformation method can thus be considered as a preprocessing step before mapping the transformed code on said target architecture.

The target architecture is considered to be parallel and comprises typically of programmable processors. However custom parallel processors can also be dealt with. The assumption on the target architecture has the following consequences: Firstly, this means that the memory hierarchy is (at least partly) known from the beginning, and thus that it can be taken into account in the invented code transformation step. This is done by using estimates of what mapping possibilities can be done in mapping step after the invented code transformation step. Note that such mapping possibilities are enabled by doing the invented code transformation step.

The different possibilities for data reuse and memory hierarchy assignment will thus already be considered during the code transformation step. However, they will only be estimated: the real goal of the invented code transformation step is to improve the data locality and regularity of the code w.r.t. the target architecture. Thus the output of the step is primarily the transformed algorithm, denoted second code. Of course, the estimations which were found can also be passed to the next steps, but they should certainly not be considered as fixed yet. The loop transformations influence the search space of the subsequent mapping steps, so the latter are best repeated in a more global and thorough way than during the estimations.

The concept of parallel processing dealt with here also influences the steering of the loop transformations. This means that the fact that after the invented code transformation step, mapping to parallel processors is aimed at, influences the decision making process on loop transformations being performed in the invention. Also here, estimations for a good (i.e. which leads to a good data locality and regularity) parallelization and processor partitioning will be made during the transformations, but it is not fixed yet; this is done by the parallelizing compiler which will have the transformed code as input. However, since a parallelizing compiler also works by transforming the code, it will in this case be necessary to pass constraints to the compiler, such that it does not undo the optimizations, performed by the invented code transformation method.

It must be emphasized that after the invented code transformation method an existing parallelizing compiler can be used. This simplifies the already very complex problem as already existing compiler is used, in which much experience is incorporated. Such compiler is also heavily tested and shown to be working. Moreover the constraints imposed by data transfer and storage steps still allow a (near) optimal parallelization, so a separate compiler (which operates after the invented method) is sufficient. Naturally more dedicated parallelizing compilers can be used also.

The target architecture is parallel, programmable and heterogeneous. It consists of a number of processors, each of which has a data-path with some functional units and a number of registers. Each processor can also have a local memory hierarchy, consisting of (software controllable) SRAM's and (hardware controlled) caches. Hybrid cases are also possible, e.g. caches which can be partly locked to a certain address range, and which will then behave as an SRAM. Furthermore, there is a global distributed shared memory. Note that program memories are not taken into account.

Said target architecture comprises at least two processor and at least three levels of storage. Said target architecture can be denoted to be a parallel architecture. Each level comprises of storage units, wherein variables, defined in said codes can be stored. Said levels define a hierarchy between storage units. Storage units in a first level are denoted local storage units. Storage units in the second level are less local than the ones in said first level. Storage units in a level N are less local than the ones in Level N−1, N−2, . . . and said first level. Storage units in the highest level are denoted global storage units.

The important parameters at this level are the size of each of the memories, and the bandwidth between the levels of the hierarchy. The latency does not have to be taken into account at this level (for data-dominated multi-media and communication systems). Indeed, by using software pipelining techniques, this latency can usually masked during the detailed instruction scheduling at the end of the compilation process. E.g., when the latency is predictable (i.e. when we are not dealing with a cache), a number of delay slots are usually available after the memory load instruction. These delay slots can be used for instructions which do not depend on the loaded data. A cache will of course not be able to always maintain its maximal bandwidth (the hit rate will be less than 100%), but at this high level the cache strategy is not taken into account. Since in most cases the hit rate is close to 100% after all DTSE (data transfer and storage) optimizations, it can be assumed that a cache behaves ideally and that the hit rate is thus 100%. Doing the opposite (ignoring the cache i.e. assuming a hit rate of 0%) would lead to very irrealistic worst-case results. However the expected hit rate can be used as a tuning parameter in the method. Note that on a RISC processor, only the load/store functional unit has to be stalled when a cache miss occurs. On a VLIW, all functional units have to be stalled, but still prefetch instructions can take care of loading data into the cache before it is actually used (and thus avoiding stalls).

The bandwidth between the register file and the data-path is always determined by the number of functional units which can operate in parallel. There is no restriction on the communication between the functional units and the registers. For the invention it is only this bandwidth itself which is important as we do not take into account the type of the instructions during the DSTE optimizations. At this level no power can be gained either, since all data on which operations are executed, have to be transferred between a register and the data-path.

The available bandwidth between the local memory or cache and the register file is usually determined by the number of load/store functional units in the processor. Here power optimizations are already possible, by minimizing the use of load/store instructions, which means maximizing the use of the register file.

The input of the invented method will be a multi-dimensional signal processing algorithm, together with the target architecture on which it has to be mapped, and some cost functions for the memory organization. In the invented method said algorithm or first code is thus loaded. Besides the amount of processors, also internal processor characteristics, more in particular, internal storage related information, of at least one processor are loaded.

The input code is preferably an algorithm on which a full data-flow analysis has already been done, and where the result is expressed explicitly in the code by using single definition semantics (single assignment except in while loops), e.g. in the form of a Silage or DFL-program, or a semantically equivalent C-description. Therefore, it can further be assumed here that the input is in the mathematical form of a set of conditional recurrence equations. Said equations are not restricted to be affine or piecewise affine functions in general. While a set of recurrence equations is not always procedurally executable, one can impose this constraint on the input. The input, which has already passed through the pruning and data-flow transformation step, will thus be a program in the form of a procedurally executable set of Conditional Recurrence Equations (CRE's). A CRE is defined here as a 6-tuple as shown in FIG. 31.

Also the target architecture, especially the (partial) memory hierarchy and the related power and other cost models for the memory organization in said memory organization is loaded as input.

The output of the invented method is a second code, thus a transformed program, which has been optimized for locality and regularity, considering the target architecture. Another output can be an estimation of the processor partitioning (preferably in the form of constraints). Possibly, also an estimation for the data reuse and in-place mapping (and thus for the memory hierarchy organization) can be passed to the further mapping stage. The output can be a tranformed set of procedurally executable Conditional Recurrence Equations with an ordering vector associated to each of these CRE's.

The Polyhedral Dependency Graph model [F.Franssen, F.Balasa, M.van Swaaij, F.Catthoor, H.De Man, Modeling Multi-Dimensional Data and Control flow, IEEE Trans. on VLSI systems, Vol.1, No.3, pp.319–327, September 1993.] is used in the optimization problem. In this model, a loop nest of n levels is represented as an n-dimensional polytope, where each integer point of the polytope represents an instance of an operation of the loop nest. The size of the polytope in each dimension is determined by the boundaries of the loop nest. In this model, all dependencies between the operations can be specified exactly, in contrast with the more conventional parallelization techniques that make use of direction vectors. Although the polytope model is exact, it has a compact mathematical description.

The PDG model is based on the polytope model, but is not restricted to one loop nest or polytope. Instead, each loop nest of the algorithm is represented by a polytope. Dependencies between the operations are captured exactly in relations between the polytopes. The PDG is a directed graph, of which the nodes represent the polytopes and the edges represent the relations. So each node of the PDG is associated with a CRE as defined above, and each edge e=(p,q) of the PDG is associated with a dependency function as shown in FIG. 32, where n_x is the dimension of polytope x. Each operation instance belonging to a recurrence equation (polytope) defines a single signal instance. The space of the signal instances being defined is called the definition space of the recurrence equation. The relation between the points in the polytope and the points in the definition space is given by the index function of the signal in the recurrence equation. Since each signal instance can be defined only once, the relation between the polytope space and the definition space is a one-to-one relation and thus invertible. Each operation instance uses certain signal instances as operands. The spaces of the signal instances being used as operands are called the operand spaces of the recurrence equation. The relation between the points in the polytope and the points in an operand space, is given by the index function of the operand signal in the recurrence equation. Since a set of operations may use the same operand, this relation is not necessarily a one-to-one relation, and thus the index function that maps polytopes to operand spaces may be singular. The dependency relations between the polytopes can be computed from the index function which map polytopes to definition and operand spaces.

Given the two recurrence equations of FIG. 33 then the dependence function from polytope 2 to polytope 1 can be computed as in FIG. 34. This relation gives for each point of polytope 2, the point of polytope 1 on which it depends, if a dependency exists. The relation gives no indication whether a dependency exists or not. To answer this question, the intersection between the definition space of equation 1 and the operand space of equation 2 has to be computed by a conventional dependency analysis. Given the same two recurrence equations, a dependency exists if there is a solution to the problem depicted in FIG. 35.

When the index functions are affine, this is an ILP problem. Solving this ILP problem gives the points for which a dependency exists.

The PDG model is a pure data flow model, it tells nothing about the order in which the operations will be executed. However, a control flow model based on these constructs allows for a generalization and formalization of high level control flow transformations and their steering. A control flow is defined in two phases in the invented method: In the first Placement phase all polytopes are mapped to one common iteration space (in a non-overlapping way). In a second ordering phase an ordering vector is defined in this common iteration space.

In this way, global control flow transformations are possible, which are not prohibited by artificial boundaries in the algorithm specification, or by the initial ordering in this specification. This basic control flow model can be modified or extended based on the context in which it is used. For example, in the invented method the ordering should not be fixed completely after the loop transformations. Therefore, it is better that only a partial ordering is defined in the common iteration space, i.e. that the necessary constraints to achieve an efficient (in terms of DTSE) control flow are passed to the next step of the script. In a parallel processor context, an additional (preliminary) processor mapping can be defined for all operations. Furthermore, the ordering can be split up into a global and a local ordering. The global ordering gives the synchronization constraints between processors, the local orderings define the ordering of the operations executed by each processor. Furthermore, estimations for data reuse can be used during the control flow transformations. These estimations can be passed to the next steps of the DTSE script too.

Below, the different issues of optimizing in a parallel processor context with a memory hierarchy are described in more detail, along with some examples.

During the placement phase, the polytopes, at least two, are mapped to the common iteration space with essentially affine transformations. Since no ordering information is available yet in this stage, the concept of time cannot be used: only geometrical information is available to steer the mapping process. For DTSE, the main objective will be to make the dependencies as short (locality) and as regular (regularity) as possible. After said placement step, an ordering step follows. It can be stated that during the placement phase, the potential locality and regularity of the code are optimized, such that a good starting point to optimize the real locality and regularity during the ordering phase is obtained.

Although the placement alone does not define a complete transformation yet, local loop transformations will correspond more or less to individual polytope mappings, and global transformations will be performed by choosing a relative placement of the different polytopes.

When all polytopes have been mapped to the common iteration space, a linear ordering is chosen in this space by defining an ordering vector. This vector must be legal: it has to respect the dependencies. This means that if there is a dependency x between x and y then the scalar product of the ordering vector and the dependency vector between x and y must be positive, meaning that the ordering vector should point in the direction of the data-flow.

It is important to realize that for a programmable processor (the target platform here), this ordering vector does not have the same stringent meaning as for e.g. a systolic array. The ordering vector only defines the relative ordering of all operations, not the absolute ordering. So if holes are present in or between the polytopes, these do no correspond to time points. Depending on the quality of the code generation, they will be skipped by if-statements or by modified loop bounds.

The execution order of the operations can be visualized as a hyperplane, orthogonal to the ordering vector, which traverses the iteration space. This hyperplane cuts the dependencies which are alive. The source data corresponding to these dependencies have to be stored in memory at that moment of time.

Figure 2:
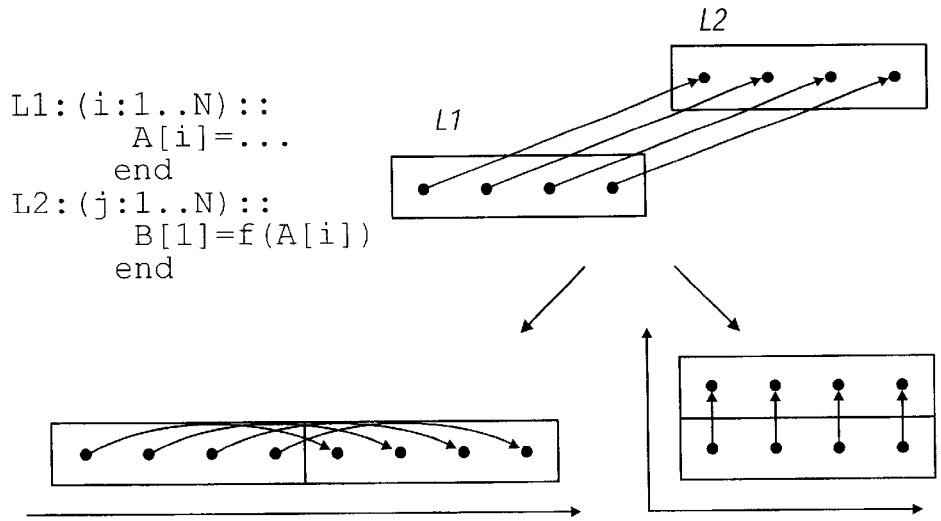
FIG. 2 shows in the right top part how source code, comprising here of two loop nests, can be represented geometrically. Each loop nest is associated with an iterator space. In between said loop nests dependencies, representing the production-consumption pattern of said code, are indicated. The bottom part shows how said iteration spaces can be mapped into a common iteration space. Two potential mappings are shown.

An illustration on loop merging is given now. In FIG. 2, a program consisting of two loops (polytopes) is shown: the first loop computes an array A[ ] and the second computes an array B[ ] out of A[ ]. The iteration spaces of the loops are presented geometrically, and the dependencies between the operations are drawn. Two (out of many) possibilities to map these polytopes to a common iteration space are shown: at the left, they are mapped linearly after each other, and at the right, they are mapped above each other. Note that for this last mapping, the dimension of the common iteration space needs to be higher than the dimension of the individual polytopes. It is clear that in the first solution, the dependency vectors are very long, while they are very short in the second solution.

Figure 3:
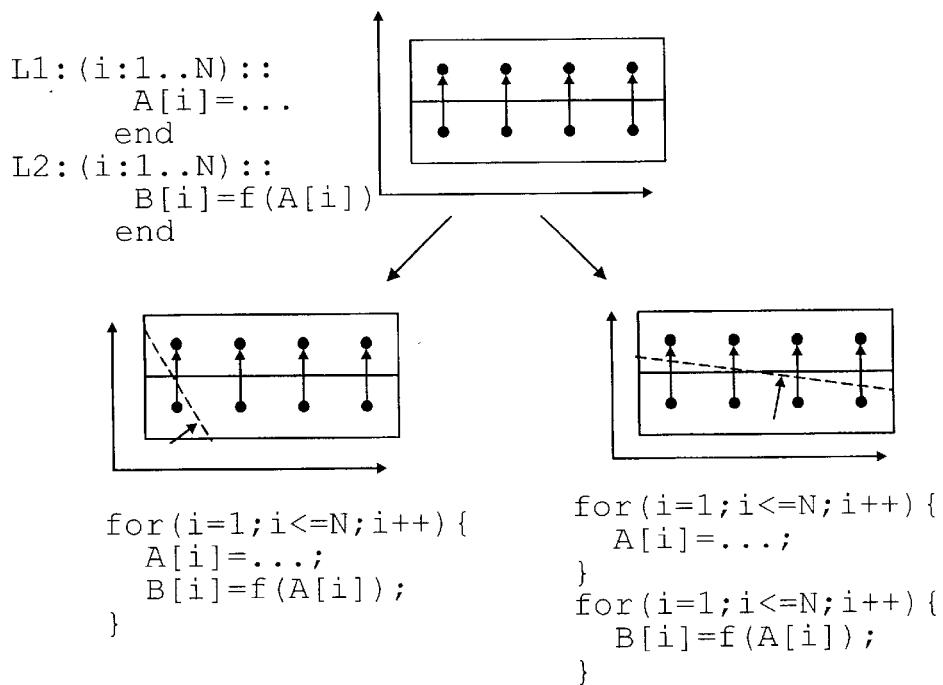
FIG. 3 shows in the right top part one of said potential common iterator spaces of FIG. 2. In the bottom part two possible orderings in said common iteration space are shown, together with the related code. The best ordering is in general known as a loop merging.

If no one has to define an ordering vector for the first solution, there is only one possibility: traversing the space from left to right. At most N dependencies will be crossed at the same time, which means that a memory of N locations is required to execute the algorithm. For the second solution, there are several possibilities to traverse the iteration space: see FIG. 3 (which shows the ordering vector along with the corresponding procedural version of the algorithm). The ordering vector at the left represents in fact a loop merging of the initial algorithm. Only one register is required in this case. The solution at the right represents the procedural interpretation of the initial algorithm: a memory of N locations is required again in this case.

It is thus clear that in this example, the first placement will not lead to a good solution, while the second placement will potentially lead to a good solution. Therefore, it is said that the second placement has an optimal potential locality. Choosing a good ordering vector can then exploit this.

Figure 4:
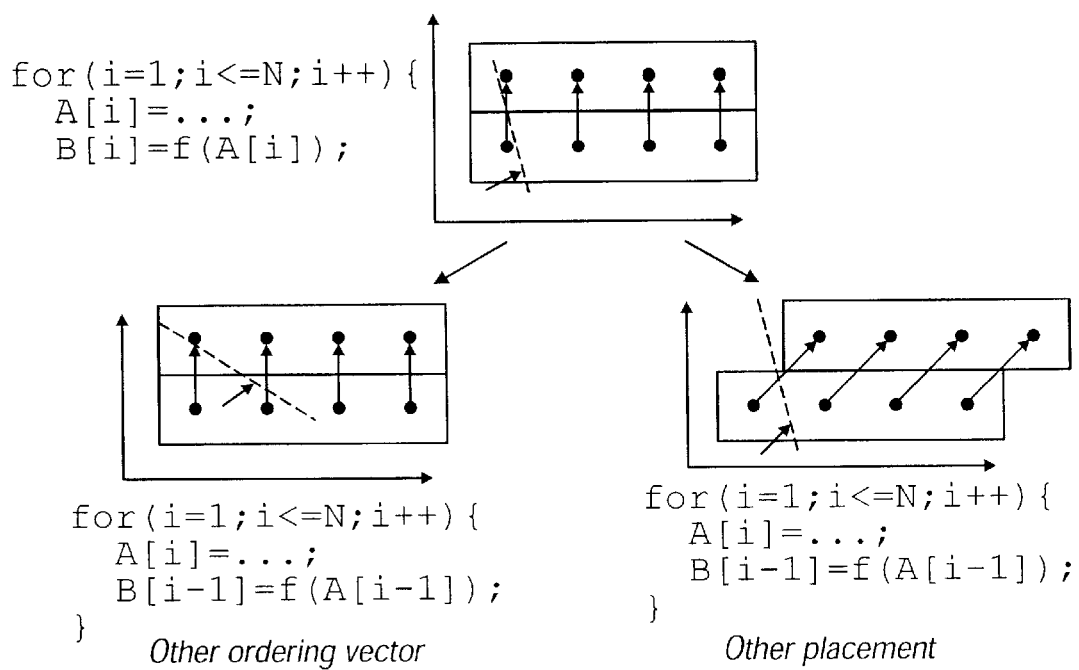
FIG. 4 shows the relation between the placement of iterator spaces and ordering within the resulting common iterator space. The result of these mappings and orderings are general known as loop foldings.

An illustration on loop folding is given now. FIG. 4 shows two ways in which a loop folding transformation can be performed: by choosing a different ordering vector, or by choosing a different placement.

Figure 5:
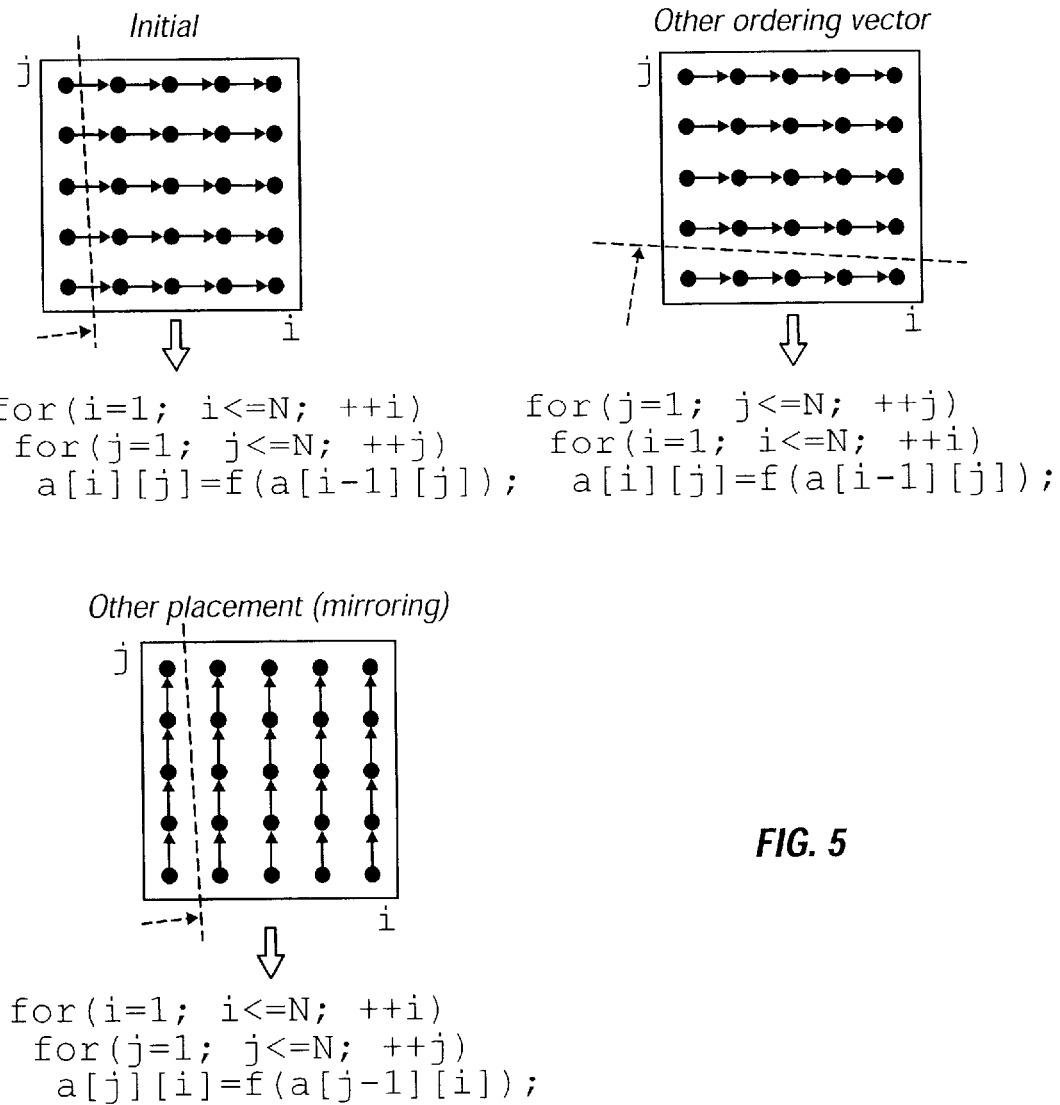
FIG. 5 shows potential mappings and orderings in the common iteration space. The result of these mappings and orderings are general known as loop interchange.

FIG. 5 illustrates loop interchange. Also here two (out of many) possibilities for performing this transformation in the PDG model are presented, namely two combinations of placement and ordering.

The processor mapping maps each operation of each polytope to a processor. For each polytope k, a function $P\_k(x)$ has to be found, which defines the partitioning of the algorithm over the processors. This mapping can be reconsidered during the parallelization stage (if desired), but then within the DTSE constraints.

Figure 6:
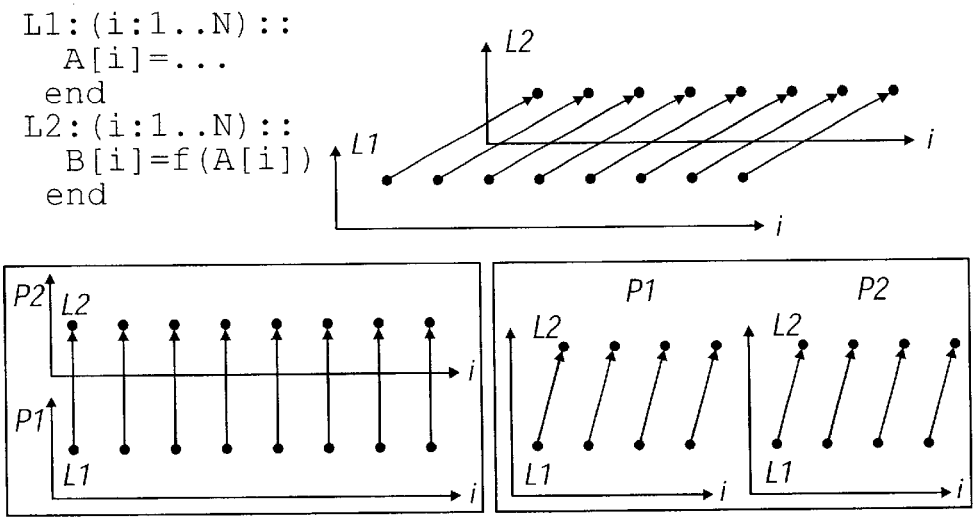
FIG. 6 shows in the right top part how source code, comprising here of two loop nests, can be represented geometrically. Each loop nest is associated with an iterator space. In between said loop nests dependencies, representing the production-consumption pattern of said code, are indicated. The bottom part shows how processor mappings are represented.

FIG. 6 illustrates the processor mapping. The program consists again of two loops, the first one computing an array A[ ] and the second one computing B[ ] out of A[ ]. The iteration spaces of the loops are shown again.

Two processor mappings are illustrated. At the left, the first loop is mapped to processor 1 (P1) and the second loop to processor 2 (P2). This results in a significant interprocessor communication: indeed all dependencies go from P1 to P2 now. At the right, half of each loop is mapped to P1, and the other half of each loop to P2. In this way, all dependencies are now inside the processors, and there is no interprocessor communication anymore.

Figure 7:
FIG. 7 illustrates the relation between ordering, more in particular local ordering, and processor mapping.

When the placement and ordering results are combined with the processor mapping, it is clear that we have to split up the ordering into a local and a global ordering. FIG. 7 illustrates a trivial case of this, again for the same two loop program as in FIGS. 3 and 6. Here, the loops are merged and half of each loop is mapped to each processor. For each processor, the local ordering is indicated; no global ordering is necessary here.

Figure 8:
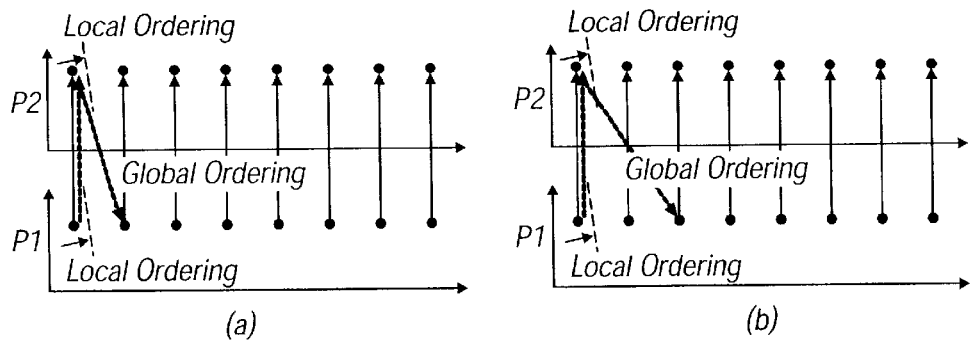
FIG. 8 illustrates the relation between ordering, both local and global ordering, and processor mapping.

FIG. 8(a) illustrates another case. Here, the loops are also merged but each loop is mapped to a different processor. The local ordering for each processor is indicated, as well as the global ordering (synchronization) constraints. Note however that this solution will prevent parallelism, because the global ordering constraints are too stringent. An additional loop folding transformation is needed to introduce parallelism. The modified global ordering constraints corresponding too a loop folding transformation, are shown in FIG. 8(b). Of course storage for two signals of array A[ ] will now be needed instead of one.

The most general problem is: at each moment of time, all signals which are alive have to be mapped to the memory hierarchy. This is of course much to complex, so simplification will absolutely be needed. It is already clear that signals in one processor can be mapped to the local memory hierarchy of that processor, while signals between different processors have to be mapped to the shared memory hierarchy.

Figure 9:
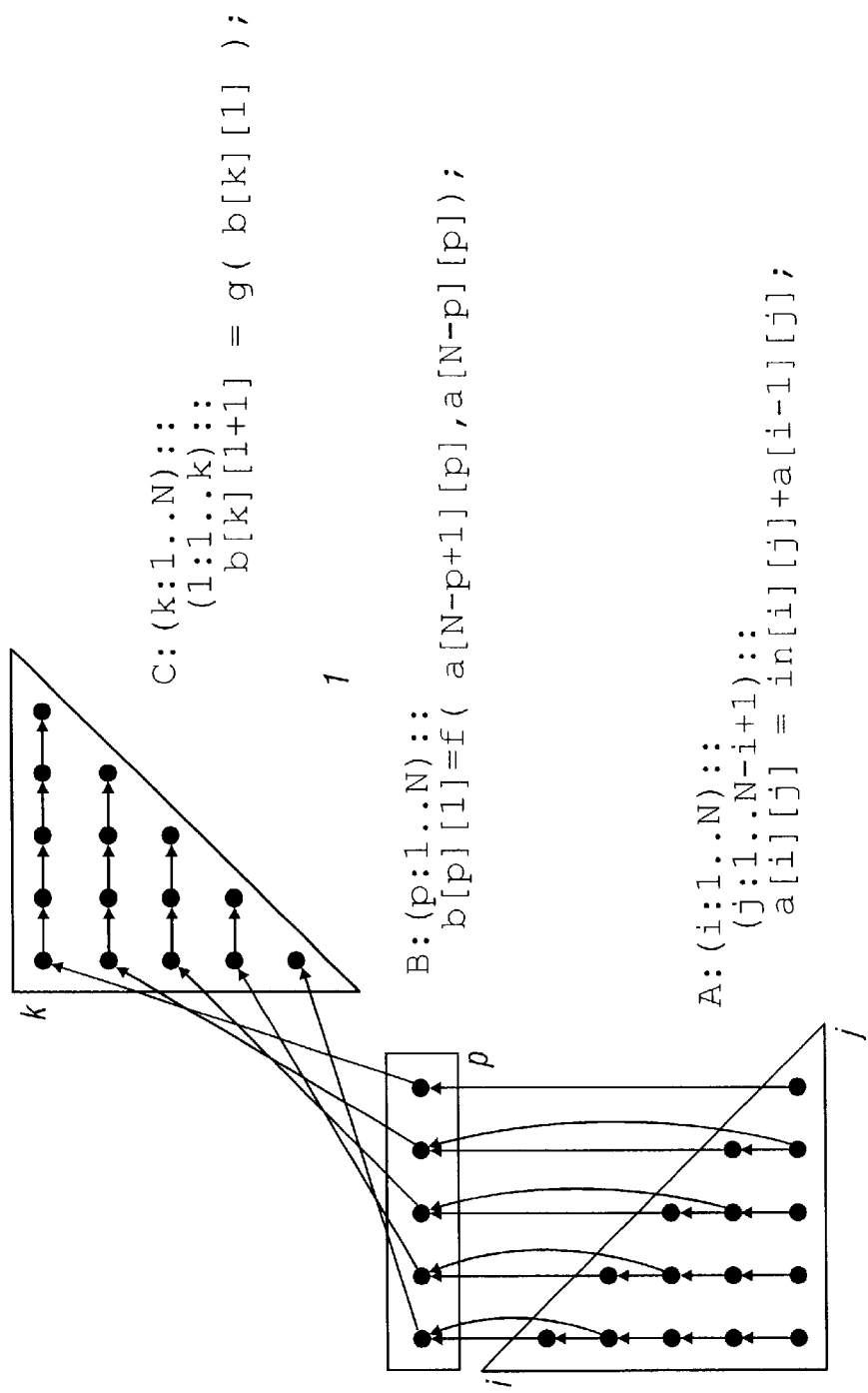
FIG. 9 shows for the source code of FIG. 34, comprising three loop nests, with the three associated iterator spaces, on which loop transformations can be applied, in order to optimize for execution on a target architecture, said optimization being steered by geometric measures. One can considered said their iterator spaces together as an initial common iterator space.

In this section, a somewhat bigger example will be given in order to illustrate how also global transformations can be performed by the placement and ordering steps. FIG. 9 shows for the initial specification described by it, the common iteration space, as it could be when the polytopes corresponding to the loop nests are more or less placed arbitrarily (in the figures, N is assumed to be 5).

Figure 10:
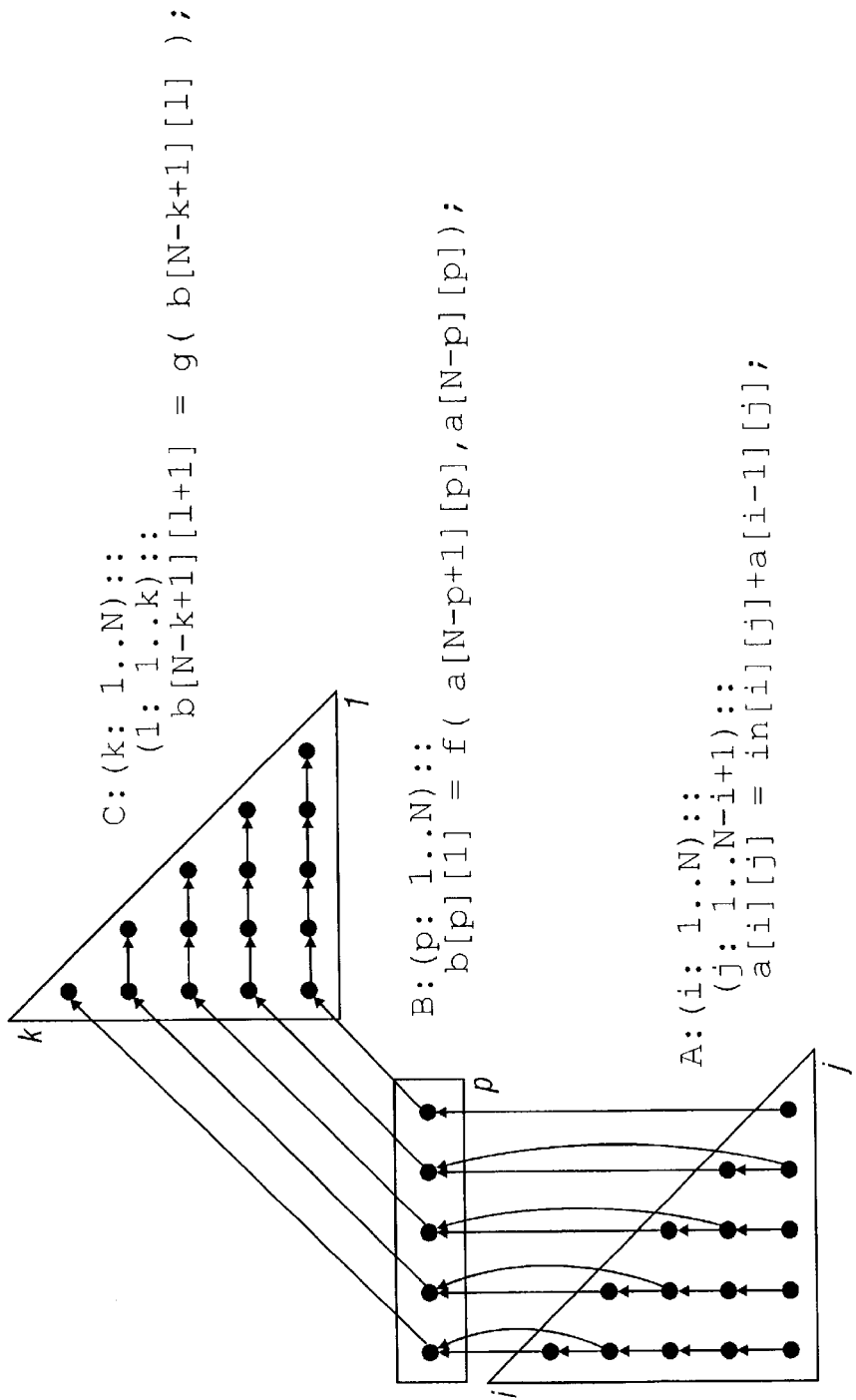
FIG. 10 shows the resulting common iteration space, by applying a transformation to the one in FIG. 9, known as loop reversals.

In a first step, we will remove the dependency cross, by mirroring polytope C around a horizontal axis. In the code, the corresponding transformations would be a loop reversal. This is however not completely true because, as explained above, we only have a valid transformation when placement as well as ordering have been chosen. The common iteration space now looks as follows: (FIG. 10). During the placement, all manipulations happen in polyhedral space, but to illustrate their effect, also equivalent loop descriptions are provided in the figures. These descriptions are however not maintained internally, and are also not really correct because no ordering has been defined yet.

Figure 11:
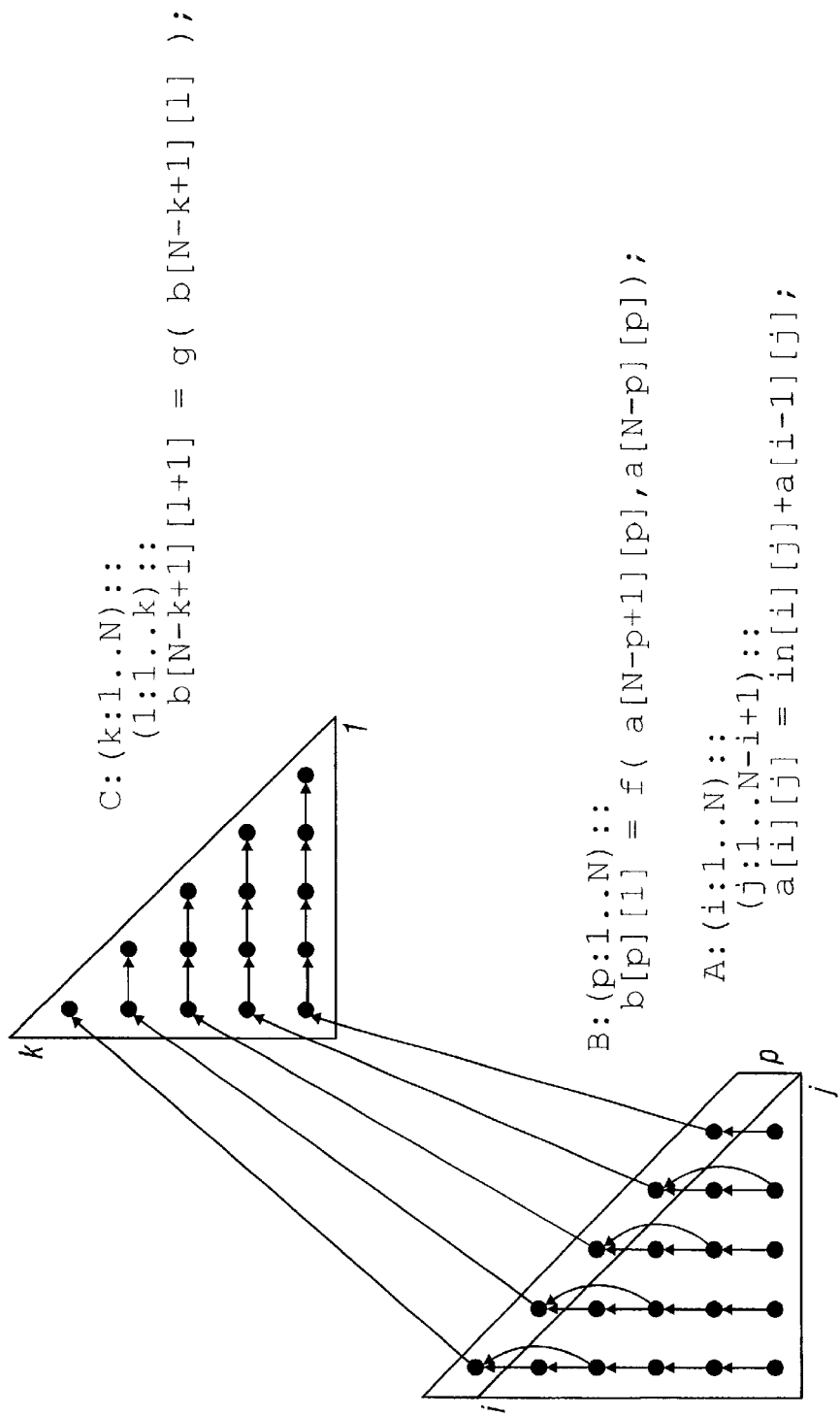
FIG. 11 shows the resulting common iteration space, by applying a further transformation to the one in FIG. 10.

In a second step, polytope B is skewed downwards, such that it closely borders polytope A. In this way, the length of the dependencies between A and B is strongly reduced. The common iteration space now looks as indicated in FIG. 11.

Figure 12:
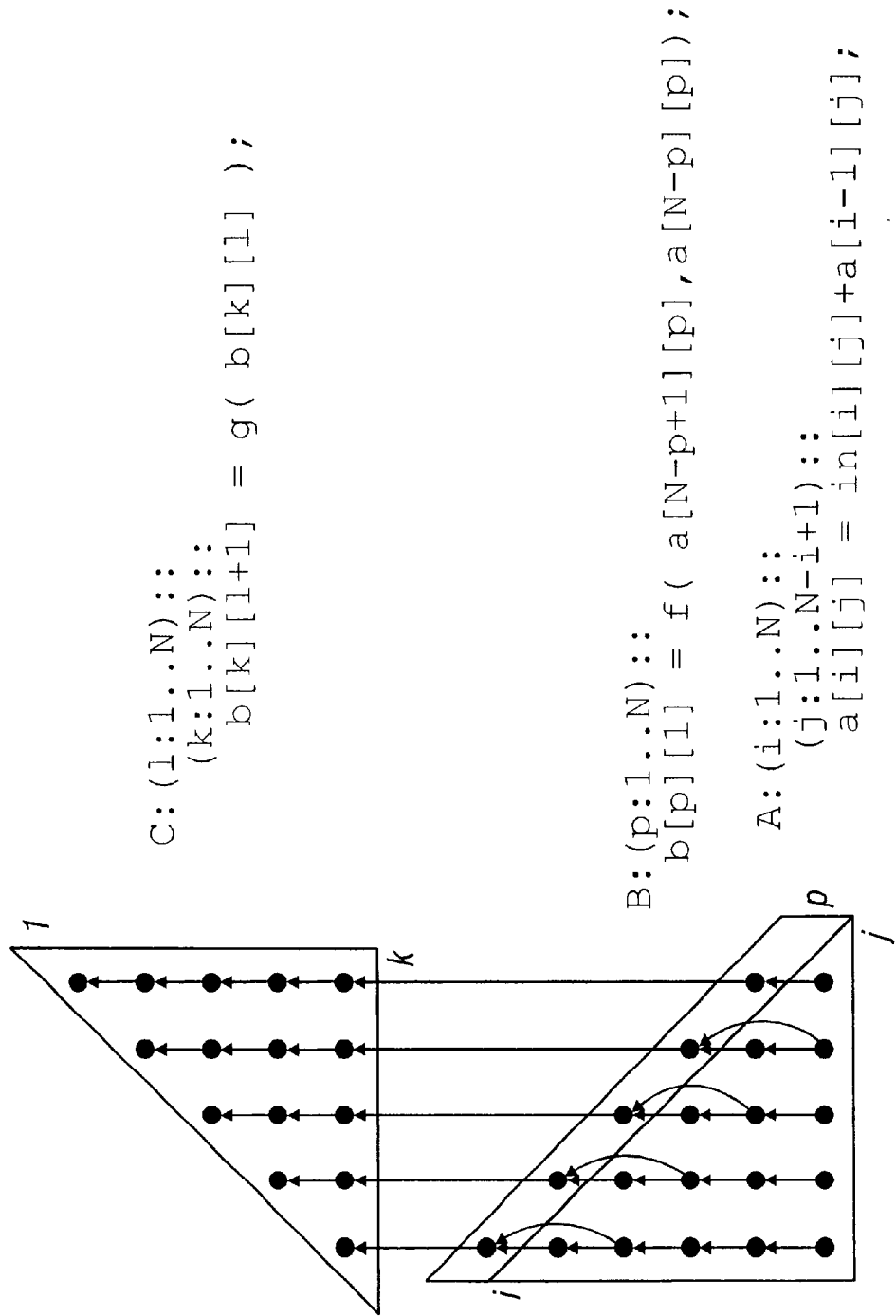
FIG. 12 shows the resulting common iteration space, by applying a further transformation to the one in FIG. 11, known as loop interchange.

Now we can see that all dependencies in A and B point upwards, while those in C point to the right. The dependencies between B and C have directions between these two extremes. However, by rotating polytope C counterclockwise over 90 degrees, we can make all dependency vectors point in the same direction (upwards). This rotation of polytope C corresponds more or less to a loop interchange transformation in the code. See FIG. 12 for the common iteration space.

Figure 13:
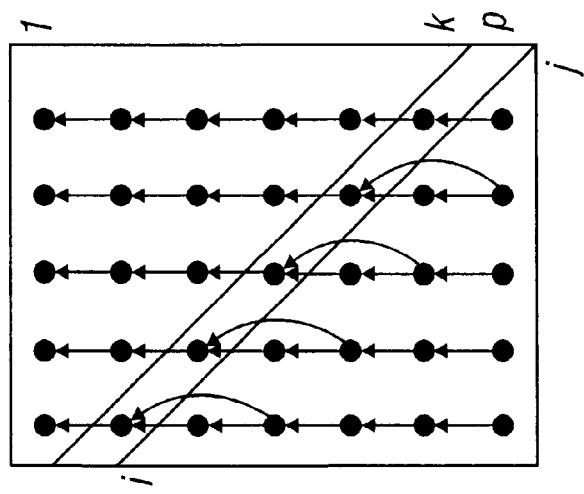
FIG. 13 shows the resulting common iteration space, by applying a further transformation to the one in FIG. 12. One recognizes in the transformation are performed such that the regularity of the pattern defined by the dependencies is improved.

Next we are going to skew polytope C downwards, such that it also closely borders polytopes A and B. In this way, the dependency vectors between B and C become much shorter. This corresponds (again more or less) to a loop skewing transformation in the corresponding code. The final placement in the common iteration space is shown in FIG. 13.

The final placement looks optimal from a geometrical point of view: all dependencies are as short as possible, and they are very regular. We will now try two of the many possible orderings for the final placement. The first ordering, as well as the procedural code which corresponds to it, is depicted in FIG. 14.

For this ordering, the required buffer space is N+3. This is not optimal at all, but it is already much better than the initial specification which required 2N memory locations. By choosing a very bad ordering vector, we can however still obtain the same situation as in the initial specification. This ordering vector is shown in FIG. 15. It cuts 2N dependencies after having traversed the first "triangle" of the common iteration space. This shows that the placement phase can indeed only optimize the potential locality and regularity of the code, and that the real decisions are taken during the ordering phase. Also, this means that it will be difficult to obtain upper bounds for the storage requirements, already during the placement phase. It seems that these upper bounds could even increase, as the enhanced regularity of the dependencies also allows to choose an ordering vector which cuts more of them, compared with the initial specification.

Searching for an ordering vector which cuts the minimum number of dependencies, we find the solution indicated in FIG. 16. This solution requires only 2 registers of storage. In this solution, the optimized potential locality and regularity of the placement phase, is fully exploited by the ordering vector.

Conventional space-time mapping techniques can be applied to the common iteration space. They will assign the j-loop to space and the i(=k) loop to time, because this results in a maximally parallel solution with the least amount of communication. As for the partitioning, all processors will get an equally large amount of values of the j-loop to execute, because the iteration space is rectangular (for each value of j, the same number of operations have to be performed). This is shown in FIG. 17. For each processor, the local ordering vector will be the same as in FIG. 16. No global ordering constraints are needed since there is no interprocessor communication.

Figure 18:
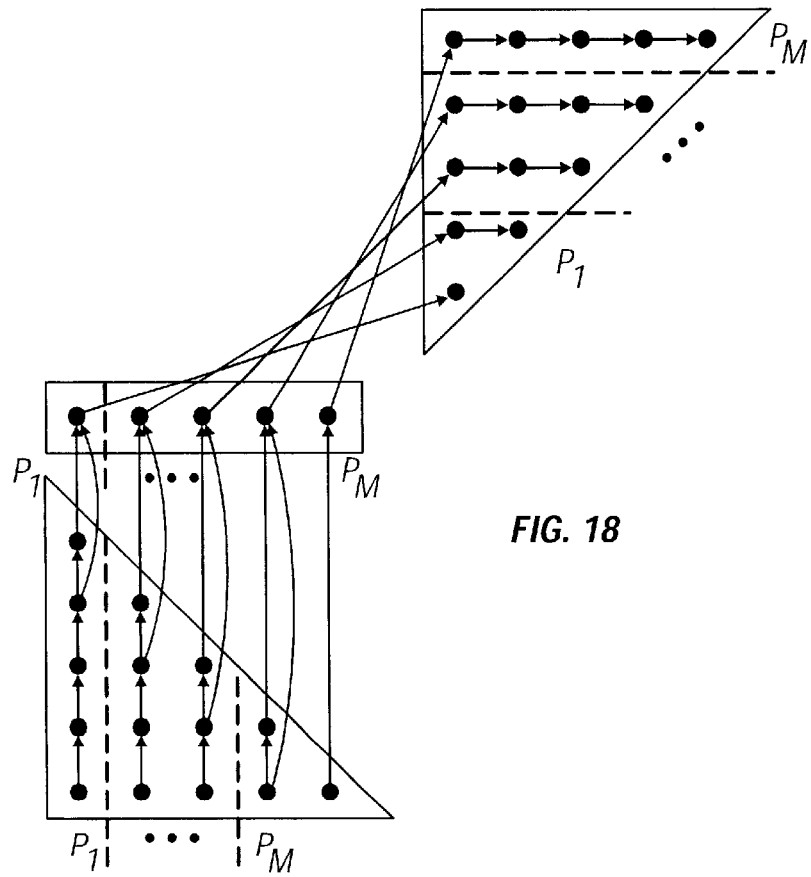
FIG. 18 shows a possible processor mapping in original common iteration space of FIG. 9.

When the loop nests would be parallelized individually, the same space-time mapping would have been chosen for each of the three loop nests, but the partitioning would have been different because the individual loop nests are not rectangular. The first and third loop nest are triangular in an opposite direction, and to achieve a good load balancing, a different partitioning would have to be chosen for both, as depicted in FIG. 18. This results, of course, result in interprocessor communication. In this simple example, this can be partly solved by using a circular (instead of block-based) mapping, but in general circular mappings lead to synchronous fine-grain parallelism with a lot of interprocessor communication, and they are for this reason not preferred, certainly when low power is an issue.

Now it is described how the optimization process will work, i.e. how the search space set up by the placement and ordering steps (and also the parallelization and data reuse estimation steps) will be explored. It is clear that many heuristics will be needed to explore the search space in an efficient way. It is already very complex in the two-dimensional case, and when more dimensions are present, it becomes also much more difficult to reason about it.

The main idea was already outlined above. The main idea is to have two separate steps for the control flow transformation process, i.e. the placement and ordering steps. We have also shown that, because of this, all transformations can be performed in many different ways, by different combinations of placement and ordering.

Another way of working would be to place the polytopes in a common iteration space with a fixed ordering, i.e. in which the order and direction in which the dimensions will be traversed is fixed beforehand. Because of the fixed ordering, most transformations can only be obtained in one way. This would be a much more direct way of working, since the concept of time is known during the placement in this case.

In fact, this optimization strategy would be quite similar to prior-art strategies. Said prior-art approaches have not led to an automated loop transformation methodology. The originality of the invented approach lies exactly in the separation of the placement and ordering steps, and in the distinct cost functions used during these steps.

The advantage of decoupling placement and ordering is that it makes the problem less complex. In each step, a cost function can be used which is more simple than a combined cost function. E.g. for the placement, purely geometrical cost functions (such as average dependency length and dependency cone) can be used which do not consider time.

On the other hand, the consequence of this is that the real decisions are taken in the ordering step. During placement, the method uses heuristic cost functions. The placement can be considered as a preliminary phase, which increases the potential locality and regularity of the code. The ordering phase will then increase the real locality and regularity. Of course, as always when a search space is splitted, this induces the risk of falling into local minima. In this case this would mean that a placement is obtained which seems optimal, but for which no good ordering is possible, such that it does not lead to a good final solution.

To summarize, the advantage of the invented optimization strategy is that the complexity is reduced. In each step, a cost function can be used which is more simple than a combined cost function.

A straightforward implementation of such a decoupled optimization strategy would be that all transformations can be performed in many different ways, by different combinations of placement and ordering and that only heuristic cost functions are possible during the placement, such that sometimes a placement can be chosen which does not allow a good ordering (and final solution) anymore. This last point will especially occur when after the placement, almost no freedom is available anymore for the ordering (or in the worst case when no ordering is possible at all). So to prevent this situation, taking care that enough freedom is still available after the placement, is necessary. Luckily, this is not conflicting with the goals of the placement itself (potential locality and regularity optimization). Indeed, optimizing the regularity means that the dependencies will point as much as possible in the same direction. Still, it means that a careful selection of a cost function for the regularity is necessary.

E.g. one dependency which points in a completely different direction than most others, will not have a strong influence on the potential locality and regularity (since it corresponds to at most one source signal for which storage is necessary). However, it will severely reduce the possible choices for the ordering vector. Therefore, a measure of regularity is needed which takes into account all dependencies: a statistical measure like the variance is possibly not sufficient. The extremes within the set of all dependencies can be preferred as better choice.

Two more remarks can be made here. While the placement and ordering phases are semantically totally separate, it is of course not forbidden to try the ordering step now and then during the placement (to provide early feedback). When no good solution can be found during the placement, one can always shift the work to the ordering phase in the following way: by increasing the dimensionality of the common iteration space, one can place the polytopes as close as one wants to other polytopes. However, the complexity of the rest of the placement phase and of the ordering phase is increased in this way.

Solving the processor mapping and placement/ordering at the same time is too complex. Therefore, three possibilities remain: The first option is doing first the processor mapping and then the placement. This would not be in line with the conclusions of several experiments [K.Danckaert, F.Catthoor, H.De Man, Platform independent data transfer and storage exploration illustrated on a parallel cavity detection algorithm, Proc. CSREA Conf. on Par. and Dist. Proc. Techniques and Applications, Vol. III, pp.1669–1675, Las Vegas Nev., USA, June 1999.], which have shown that this leads to large buffers between the different processors. Indeed, the parallelization has too be done after the DTSE steps in order to arrive at a good solution. The second option is first doing the placement and ordering in one global common iteration space, and then doing the processor mapping. The problem is that, when an ordering vector has already been defined, the search space for the processor mapping will be severely restricted. The ordering vector has to be converted into a set of local ordering vectors, and some global ordering constraints. There are very few possibilities to do this without modifying the initial ordering, which will in many cases even prevent parallelism. The third option is doing first the placement, then the partitioning and then the ordering. In this way, the partitioning will be done using the geometrical properties of the PDG model (and without using the ordering). This means that for the partitioning, one will already be able to use heuristic properties like distance, dependency vector length, number and variance of dependency vectors cut by a partitioning hyperplane . . . ; while the real ordering (and thus the real distance in time between operations) cannot be used.

In an embodiment of the invented method one implements the third option because it offers the best compromise. The placement can then be considered as a preliminary locality and regularity increasing step for the ordering and partitioning. The most complex part is the placement; may be the complexity of partitioning and ordering will be low enough to do them (partly) together. More specifically, conventional space-time mapping techniques could be used in the common iteration space.

Note that the second and third method have also as an advantage that they make it easier to generate the constraints for the parallelizing compiler (since it will be more clear which part of the processor mapping was actually necessary for the DTSE). On the other hand, incoming constraints on the processor mapping (e.g. in heterogeneous architectures) will be easier to handle with the first method.

The goal of the placement phase is to increase to potential locality and regularity of the code. Of course, it is essential to have good cost functions for these optimization goals. Since no ordering is being defined yet, only geometrical information can be used to achieve an optimal mapping in this phase. The aspects which will be optimized, are the dependency length and the dependency variance. Indeed, dependency vectors which are geometrically shorter will generally also lead to shorter lifetimes of the associated signals, as has already been shown in the examples. The variance of the dependency vectors should be as small as possible, preferably with all dependency vectors being identical. Firstly, reducing the dependency variance will reduce the number of dependencies which cross each other (see the difference between FIGS. 9 and 10 for an example), and this will in turn lead to better locality and shorter lifetimes of the involved signals. Secondly, reducing the dependency variance creates more freedom for choosing a linear ordering vector (in the second phase) which respects the dependencies.

Figure 19:
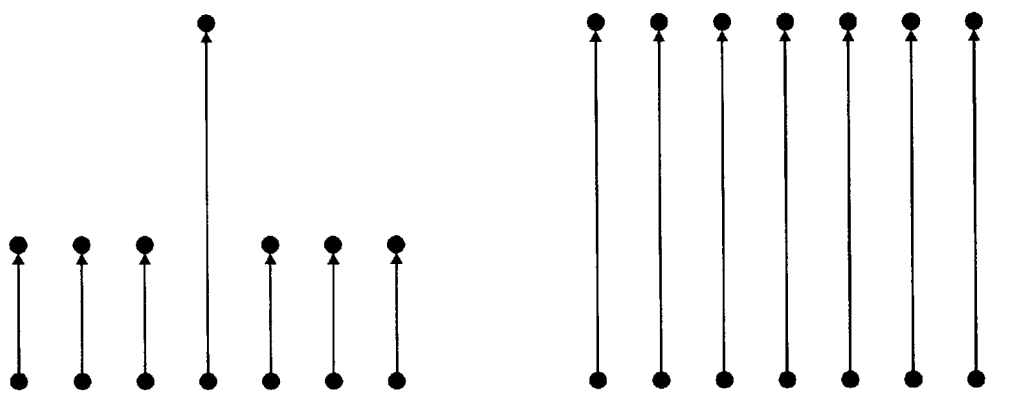
FIG. 19 shows possible situations while considering dependency lengths.

For the potential locality (dependency length), it seems appropriate to use a rather default cost function, namely the average dependency length (or equivalently, the sum of all dependency lengths). This means that extreme dependency lengths will not receive special attention, but that is not necessary since one dependency corresponds only to one source signal that has to be stored, and they to not reduce the search space (freedom) for the ordering vector. So in FIG. 19, the solution at the left (with a longer extreme but shorter average length) will be preferred to the solution at the right (with a shorter extreme but longer average length).

Figure 20:
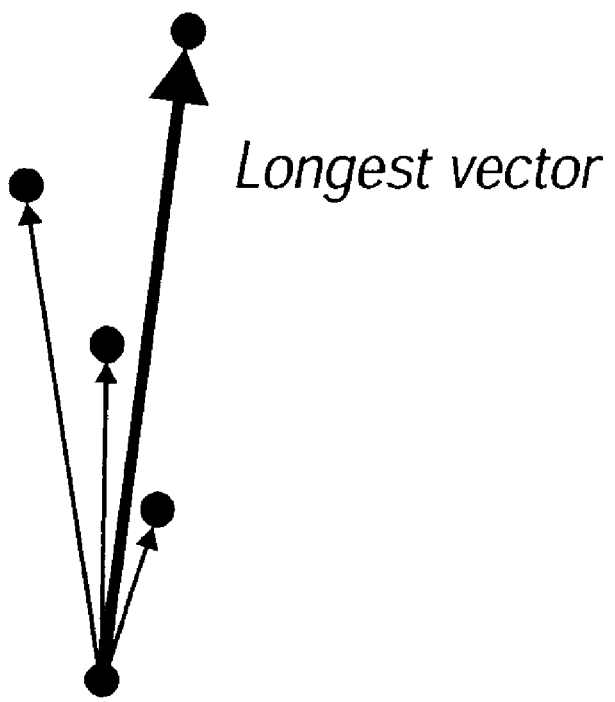
FIG. 20 shows the situation wherein several dependencies have the same source signal.

One refinement is necessary for this cost function: when there are several dependencies with the same source signal, only the longest dependency has to be taken into account, since the source signal has to be stored only once. Also data reuse can be incorporated into the cost functions. This is shown in FIG. 20. Of course, this is only valid for the dependency length calculation: when not all dependencies point in the same direction, the shorter ones still have to be taken into account for the dependency variance calculation.

Figure 21:
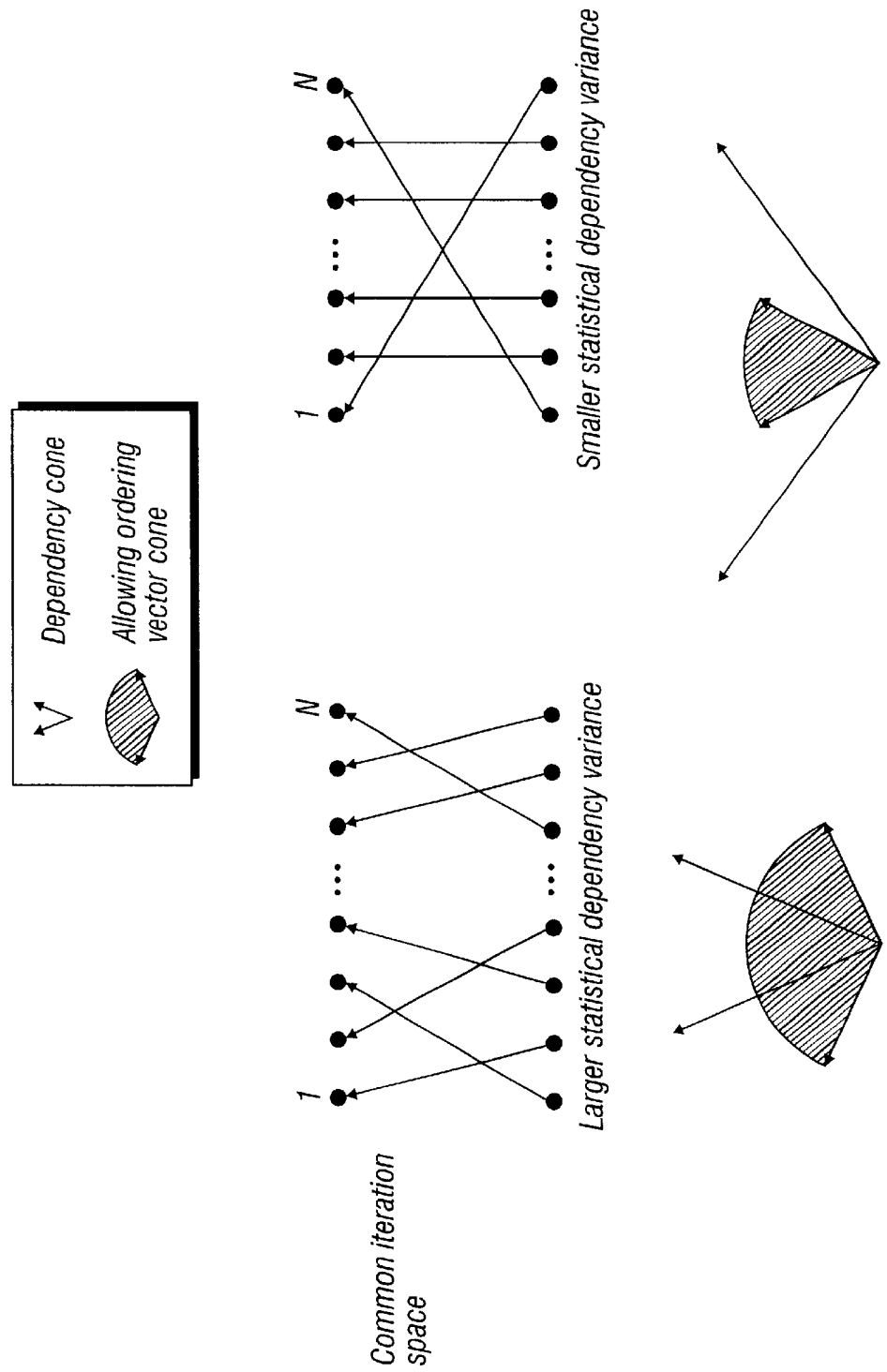
FIG. 21 shows how extreme directions of dependencies can be computed.

For the potential regularity (dependency variance), it has been already explained that a good cost function should take into account the extreme dependency directions. To adequately represent these extremes, the cost function can be expressed as the sharpness of the dependence cone (the cone in which all different directions of the dependence vectors fit). If a placement exists with a pointier cone than that of others, then this solution will have more freedom for the ordering vector, and it will in general lead to more regular and efficient solutions. This is illustrated in FIG. 21. The solution at the left has a larger statistical dependency variance than the one at the right, but its extreme directions are closer to each other. Therefore, it has a sharper dependency cone, and more freedom for the ordering vector (expressed by the allowed ordering vector cone).

Note that this dependency cone criterion can only be used as a relative measure, to compare different mappings, and not as an absolute one. Indeed, given a certain set of dependency vectors with an optimal ordering (or space-time mapping), then for any non-singular affine transformation of the complete iteration space (which, of course, modifies the dependency cone), an ordering (or space-time mapping) can be found resulting in the same solution, and therefore equally optimal. This shows that the sharpness of the dependency cone can not be used as an absolute criterion.

Figure 22:
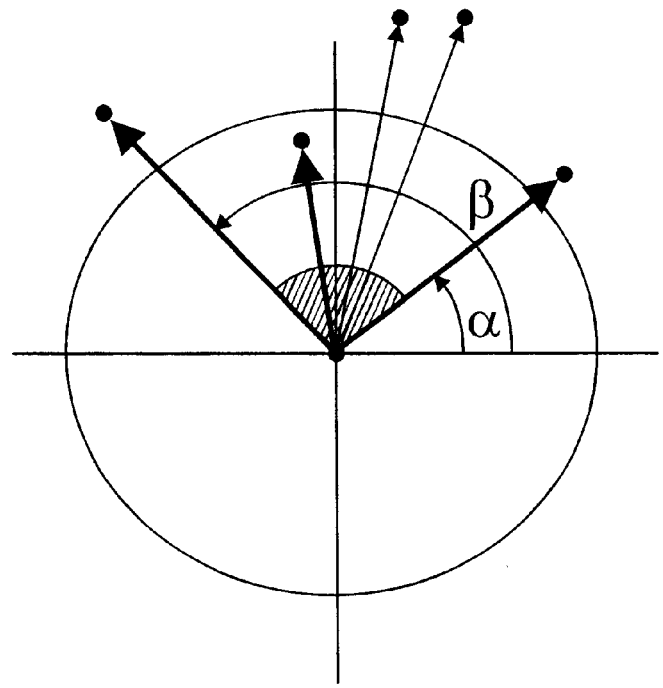
FIG. 22 shows how extreme directions of dependencies can be computed.

Some geometrical-mathematical issues w.r.t. the dependency cone will be discussed. Computing the dependency cone means computing which dependencies are extreme. In two dimensions, this can easily be done by computing the angle of all dependencies with a fixed axis (using trigonometric functions). The extreme angles correspond to the extreme dependencies, as illustrated in FIG. 22. However, computational geometry offers more convenient methods to compute the extreme vectors of a set, without computing the angles themselves.

Figure 23:
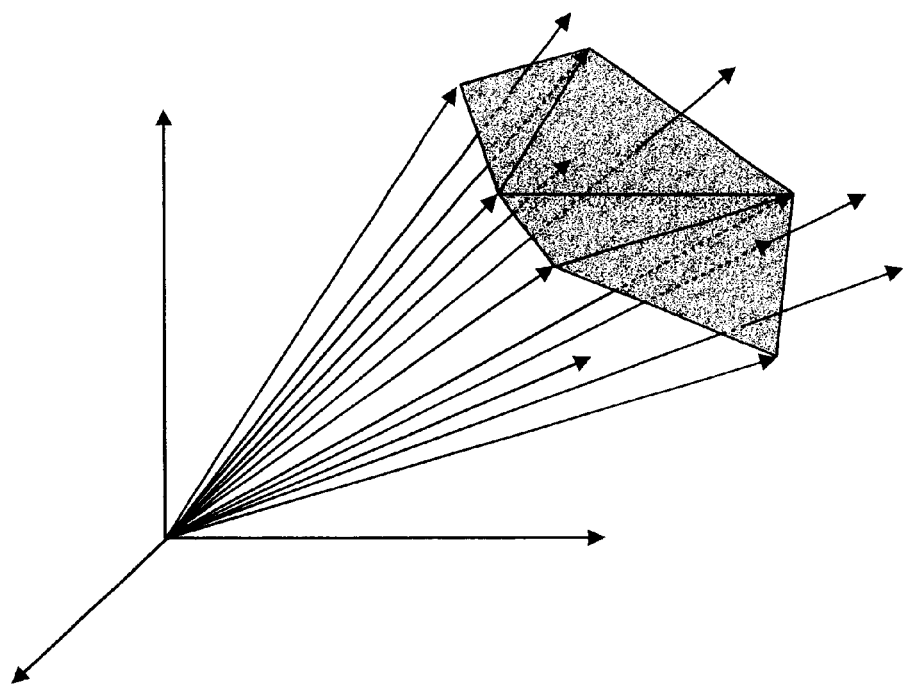
FIG. 23 shows how extreme directions of dependencies can be computed in more than 2 dimensions.

In three (or higher) dimensions, there are more than two extreme dependencies; in fact there can even be an unlimited number of extreme dependencies. This is illustrated in FIG. 23, where there are six extreme dependencies. The computation of the extreme dependencies is in this case a computational geometry problem, similar to computing the convex hull of a set of points.

When the extreme dependencies have been computed, the dependence cone is known. However, this is not sufficient to compare different cones, which can have completely different shapes (especially in higher dimensions). Therefore, one still needs some simple measurement to compute the size (sharpness) of two dependence cones.

In two dimensions, the sharpness of a cone can be easily expressed and computed: It can be expressed as an angle, in radians. It can be computed with trigonometric functions; for example from the dot or the cross product of the two extreme dependencies, since for two dependencies d_1 and d_2 which form an angle theta, said products being related to theta via a cosine or sine operator respectively.

Figure 24:
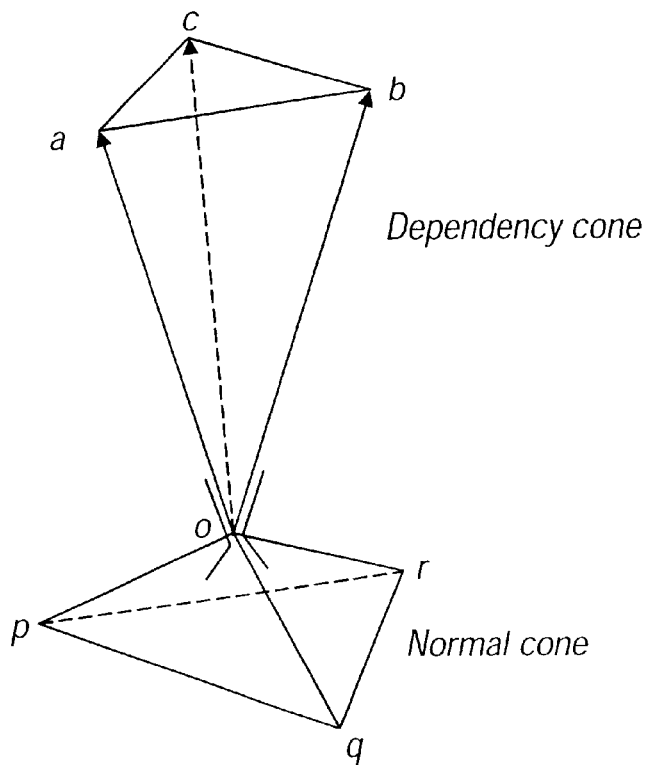
FIG. 24 shows a decomposition approach, being useful for determining the dependency cone in more than three dimensions.

In three dimensions, this becomes already more difficult: The concept of solid angle (unit: steradian) can be used to express the sharpness of a cone. Just as the size of a two-dimensional angle is the length of the arc that it subtends on a circle with radius 1, the size of a solid angle is the surface subtended on a sphere with radius one. This surface is called a spherical surface, e.g. for a three-vector cone it is a spherical triangle. The question remains how this has to be computed for an arbitrary cone, which can consist of an unlimited number of extreme dependencies. As depicted in FIG. 24, the dependence cone can be triangulated (divided in cones consisting of three vectors), so it suffices when one has a method to compute the solid angle of a three-vector cone (i.e. the size of a spherical triangle). For a three-vector cone, the following result can be used: The solid angle (expressed in steradians) subtended by a three-vector cone, is the sum of the angles of the corresponding spherical triangle. Note that the angles of the spherical triangle are the angles between the planes which bound the cone (i.e. the angles between their normal vectors) (expressed in radians) minus p. This result can easily be generalized to an N-vector cone: The solid angle subtended by an N-vector cone, is the sum of the angles of the corresponding spherical N-polygon, minus (N−2) p.

While the dependency cone adequately represents the extreme dependencies, its size (sharpness) is in fact not really significant. Imagine a very elliptic cone in three dimensions: this cone will have a small solid angle, but it can nevertheless significantly constrain the freedom for the ordering vector. This becomes more apparent when the extreme case is considered: a flat ellipse, with all dependencies lying in the same plane. This means that we have a two-dimensional cone in a three-dimensional space. The solid angle of this cone is zero steradians. This is even the case when two dependencies are pointing in opposite directions (which means that there is no ordering vector possible). Therefore the size of the dependency cone does not adequately represent the freedom for the ordering vector.

Figure 25:
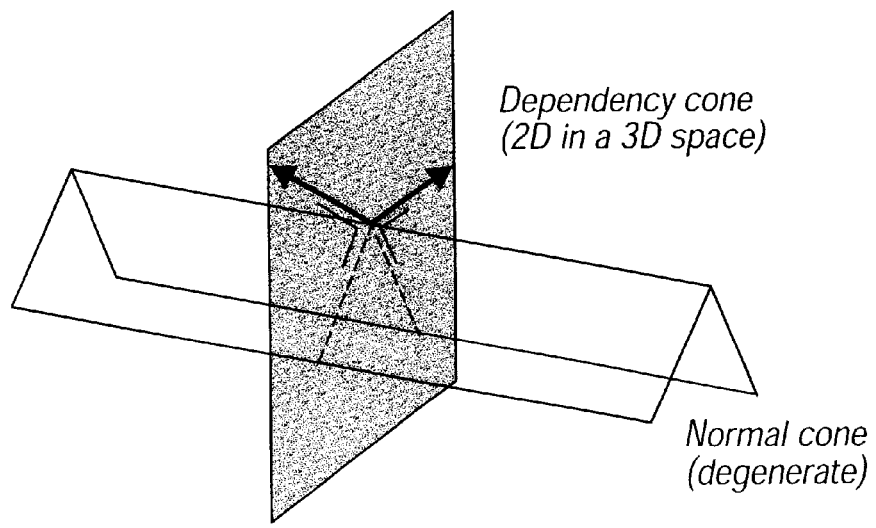
FIG. 25 shows a degenerate case found while considering computation of the dependency and the allowed ordering vector cone.
Figure 26:
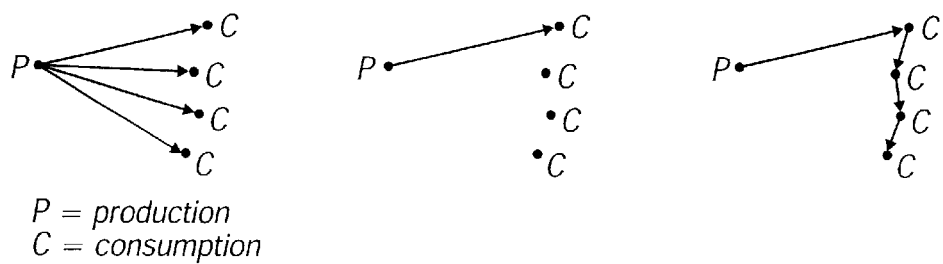
FIG. 26 shows a first potential approach for taking into account data reuse possibilities while doing placements.

Instead, another cone should be computed, the allowed ordering vector cone, which was already illustrated in FIG. 21. This cone is the negative of the supplementary cone of the dependency cone (except for the boundary, since C_a is in fact an open cone). The supplementary cone can be computed as the normal cone of the dependency cone at its origin: each dependency vector divides the space in two half-spaces, separated by a hyperplane (the normal plane of the vector). These normal planes form also a cone, the normal cone (see FIG. 26). Sometimes this cone will be degenerate. See for example FIG. 25.

Thus instead of the dependency cone, one will compute the size (sharpness) of the allowed ordering vector cone (in the same way as it was described earlier).

The goal of the control flow transformations is to increase the locality and regularity of the code. It is however an enabling step; the intent is that this will lead to improved data reuse later on in the DTSE script. Consequently, it is very much desired to have an estimation for the data reuse during the control flow transformations. This will provide more direct feedback on the quality of the control flow than only the abstract locality and regularity measures.

Since preferably the two-phase approach of placement and ordering for the control flow transformations is chosen, it would be preferable to have an estimation for the data reuse in both phases. Of course, the real data reuse can only be estimated when an ordering has (or is) being defined, but the placement limits the potential orderings. So during the placement phase, one need an estimate for the potential data reuse, independent of the ordering. Two ways to incorporate data reuse in the placement phase are now discussed.

A first way in which data reuse could be handled during the placement phase, is by inserting additional polytopes (related to loop nests) which only make copies of signals from one memory to another. When this is done using the real memory hierarchy, this would also mean that all operations in the PDG get an attribute, namely the level of memory in which their result is stored. The problem here is that one does not know which signals fit in which memories, since the ordering has not been fixed yet. Thus these extra polytopes should just make copies in an abstract memory hierarchy.

Allowing the data reuse polytopes to be inserted at every point of the exploration will increase the search space tremendously. Therefore, one should only try this when one does not arrive at a good solution for the placement of a certain polytope without doing this.

Still, it remains a problem that one does not know the ordering yet. Indeed, it is not clear then where the extra polytopes have to be inserted. A possible solution would be to insert only potential extra data-reuse polytopes. Several of these polytopes have to be inserted for the same source signal (namely at different positions, corresponding to different orderings). This would obviously increase the complexity enormously, during the placement as well as during the ordering.

Preferably an estimate of how well the memory hierarchy can be exploited for a certain placement and ordering is needed. This can only be done during the ordering step and not yet during the placement. Of course, when placement and ordering are more tightly coupled (e.g. performing a crude ordering now and then during the placement phase), it is also possible to have a crude estimation of the data reuse.

During the placement, data reuse can however be accommodated in a more general way, which does not consider the real memory hierarchy or ordering yet. This can be done by adapting the cost functions to the fact that data reuse is possible. Indeed, the invented cost functions up to now optimize the potential locality and regularity, so a logical extension is to make them take into account the potential data reuse too.

Data reuse is essentially possible when several consumptions of the same source signal are close to each other in time. It means that placing a consumption of a signal near to another consumption is as good as placing it close to the production. Indeed, when a signal is consumed it is transferred from main memory to the data path, and when it is consumed again in the near future one can as well assume that it has been produced during the last consumption. Of course, the concept of time is not known during the placement, so one will have to place the consumptions geometrically close to each other instead.

It was said before that for a certain source signal, only the longest dependency should be taken into account for the locality cost. Here a refined cost function being adapted to the possibility of data reuse is presented: all consumptions are taken into account, but for each consumption, the distance to the previous consumption is considered, instead of the production. See FIG. 26. These data reuse dependencies are only used for the locality cost function; for the regularity (dependency cone), the real dependencies have to be used.

Developing an exact cost function, requires a little more effort. The problem is again that the ordering is not known yet, so it is not know which consumption comes first (and thus not which is the "previous" one). Therefore, it is proposed to use the following heuristic, which captures all potential data reuse: for each consumption, as dependency length, the shortest length between this consumption and all other accesses is chosen.

Figure 27:
FIG. 27 shows a second potential approach for taking into account data reuse possibilities while doing placements.
Figure 28:
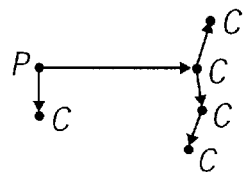
FIG. 28 shows a third potential approach for taking into account data reuse possibilities while doing placements.

This would however give a too optimistic measure, as shown in FIG. 27: there are only short dependencies left (sometimes in a cycle), while it is clear that the source signal will have to be stored in memory at least during the initially longest dependency too. What one really need is a graph containing all accesses (1 production and N consumptions), which does not contain cycles, and for which the sum of the edges is minimal. Thus as a preferred cost function for the locality, will take the minimum spanning tree over all accesses to the same source signal. See FIG. 28.

While a greedy algorithm exists for computing the minimum spanning tree of a graph, it is clear that it is still not feasible to compute this for each source signal in the exploited PDG model separately. Their should be a way to compute this for whole polytopes at once, just as the dependencies are captured in simple mathematical formulae. If this is not possible, approximations will have to be used.

In-place mapping is associated very much with the lifetimes of signals: reducing the lifetimes of the signals, will increase the possibilities for in-place mapping. Since the cost functions used during the placement, are exactly designed to lead to shorter lifetimes of the signals, no changes to these cost functions are necessary to optimize the in-place mapping.

Apart from that, it would still be useful to have a more direct estimation of the potential in-place mapping for a certain placement. Of course, an exact estimation is not possible since (again) the ordering has not been fixed yet. However, one could try to derive lower and upper bounds on the required memory size (and thus on the in-place mapping) during the placement. By placing polytopes in the common iteration space, these bounds should move towards each other, and in this way one would have a good high-level estimation for the in-place mapping. This is not possible during the placement phase, since the freedom which is left for the ordering phase, equally well allows to choose a very bad ordering vector as a very good one. This was illustrated earlier. Of course, in more complicated examples the freedom left for the ordering vector will be smaller, but the bounds which can be derived will still not be close enough to each other to be useful. Therefore if something useful could be derived during the placement, it will only be the lower bound.

When the placement phase has been performed, one common iteration space is obtained, in which potential locality, data reuse and regularity have been optimized. The ordering has to exploit these potential properties to optimize the real locality, data reuse and regularity.

Optimization of the minimal required storage size for the whole algorithm results in a simple cost function, but it is obviously not the way to go, as it does not consider data reuse, or even the number of background memory accesses. While the required storage size will still be part of the cost function, especially data reuse estimations will be important during the ordering, since the memory level in which signals are stored, has a large influence on the power consumption.

Further detail on the placement step will now be given as the ordering step is in fact quite similar to conventional space-time mapping techniques.

The cost functions of the placement phase optimize the locality and regularity in a geometrical sense, without considering the size of the memories in the memory hierarchy. A result of this is that it will sometimes not be possible to achieve good locality results (for a real memory hierarchy) with a linear ordering vector, even for a good placement.

Consider e.g. matrix multiplication. When the three-dimensional polytope of this three-level loop nest is just placed in a standard way (without transformation), the locality is quite good. Indeed, the dependencies (certainly the data reuse dependencies) are very short. The regularity is not really that good, because there are dependencies in three orthogonal directions, but this cannot be enhanced anyway.

When a linear ordering vector has to be chosen for this placement, the standard ijk-, kji-, . . . loop organizations will result. However, it is known that for large matrices, none of this versions will exhibit a good cache behavior. Indeed, in addition to the loop interchange transformation, tiling of the loop nest is necessary to achieve this.

However, during the placement phase, this is not visible because the size of the memories is not known. Nevertheless, the placement is not faulty: tiling should be performed in addition to the normal control flow transformations. In fact, one can express it even stronger: tiling is sometimes necessary, exactly to exploit a good placement! Thus it is clear that tiling should also be integrated into the invented control flow transformation methodology. The question is at which point it has to be performed: A first option is to change the placement phase so as to incorporate tiling. Tiling can be performed during the placement, by splitting an N-dimensional polytope over more than N dimensions. However, as said, the size of the memories are not known during the placement, so one does not know the optimal tile size. Furthermore, tiling individual polytopes is conflicting with the global transformation strategy described, where the global control flow has to be defined first. The second option is to perform tiling in the common iteration space, after the placement, but before the ordering. This leads again to the problem that, when the ordering is not known, also the direction in which one should tile first is not known. The third option is to perform tiling and ordering together. This seems the best way to do it, because tiling and ordering cannot be decoupled in a good way. Also, conventional transformation methods perform tiling and space-time mapping together. In this approach, an optimal ordering will normally be determined first, and when this ordering cannot exploit the available data reuse (because the local memories are too small), tiling will be performed. The third method is preferred here, which means that nothing really changes to the optimization strategy and cost functions in the placement.

The general placement strategy then looks as follows: Mapping all polytopes at the same time (e.g. by writing an ILP program) is much too complex, therefore another strategy has to be found. One possible strategy is to map the polytopes one by one. An additional step will then precede the placement, and will try to find a good ordering for the polytopes to be placed. This strategy does not lead to good solutions: only the first few polytopes can be placed in an acceptable amount of search time; for the others, either no good solution is available anymore, or it takes too long to find it. Therefore a hierarchical strategy is proposed: instead of placing the polytopes one by one (incremental placement), first all dependencies in the PDG will be analyzed. For this analysis, all possible interesting relations between polytopes should be modeled. Interesting relations are not only the dependency functions but also similarities in size, shape, internal dependency directions, etc. The placement will then proceed in a hierarchical way, first combining polytopes which should for one or another reason be taken together. Possible reasons can be that there is a very large number of dependencies between two polytopes, or that two polytopes fit nicely to each other, etc. Combining polytopes is done by imposing constraints on their relative mapping. For example: dimension 1 of polytope A and dimension 3 of polytope B should be mapped to the same dimension of the common iteration space. Since most polytopes which occur in real-world problems are of a limited complexity, this process will be done by making a classification of the most important polytopes and most important dependency functions. For each of these cases, the corresponding constraints which have to be imposed will be stored.

When several statements are present at the same level of a loop nest, and only one statement has cross-iteration dependencies or dependencies to other loop nests (i.e. only one statement produces signals which are needed outside that iteration of that loop nest), these statements can be combined into one single statement. In terms of the PDG, several polytopes (of the same shape) are combined into one new polytope, which has fewer lattice points (which represent larger atomic operations). This reduces the dimensionality of that polytope, and thus also the complexity of the search space.

In applications where the number of polytopes is really huge (several hundreds or thousands of polytopes), the hierarchical placement method proposed above, should be complemented with a further divide and conquer approach, meaning that the data flow in such applications can usually be subdivided into several loosely bounded data flows. Therefore, we foresee a clustering phase which should precede the placement, and in which the polytopes will be grouped in clusters that have relatively few interaction with each other. The placement and ordering phases will then be performed for each of these clusters separately.

Some examples on complexity reduction are given below.

In the example of FIG. 35, the C[0] signals are temporary results and only the D[ ] signals are needed outside the loop nest. This can be converted to the loop nest in FIG. 36, where the function fg is now a new atomic function (or level 3 function). Note that there is now only one dimension instead of two in the corresponding polytope. Also, all dependencies between the two initial statements have (of course) been removed. Removed means in fact: moved to the scalar level.

When both C[ ] and D[ ] are needed outside the loop nest, a single statement (C[i],D[i])=fg( . . . ) could be created, but then the optimality can be lost. This would e.g. be the case when another loop needs all values of C[ ] but only the first value of D[ ] J (D[1]). In such a case, it could be beneficial to split the initial loop, which is not possible anymore after presented simplification.

Note that some optimality may be lost for the signals which are consumed in the loop nest. For example, if this loop nest is merged with another one later on, the number of registers which are needed to exploit data reuse of the consumed signals can be slightly higher because no reordering of the individual statements is possible anymore. This can be tolerated because it is a scalar level effect (which can be undone in a later step), where the level 3 functions are expanded again.

Note that this complexity reducing transformation may seem to belong to the pruning step instead of the loop transformation step, but this is not always the case because sometimes other loop transformations may be needed to arrive at a loop nest in which this is possible. E.g. the initial loop nest in the example can be the result of merging two loops (in terms of the PDG: the initial polytope can be a combination of two other polytopes which have already constraints on their relative placement). Still, most of the simple dependence chains will have been removed, and only the more complex cases will be left to this simplification.

Sometimes very small inner loops are present (e.g. when modulo operations have been converted to loops), which increase the dimensionality of the corresponding polytope and thus the complexity of the placement and ordering steps. These loops can be unrolled to reduce the dimensionality.

Unrolling the k and I loops of the example of FIG. 38 gives FIG. 39. Since only one non-temporary signal is produced in the innermost loop now, one can also apply the technique described earlier to reduce the complexity even more as shown in FIG. 40. Avg4 is now considered as an atomic operation (or a level 3 operation in terms of the pruning step). When the index function of a certain dimension of a signal is a*i when produced, and b*i when consumed, with a different from b, the dependencies between the corresponding polytopes are not uniform. The dependency function is (b-a)*i, so each individual dependency has a different direction. This is, of course, a very irregular dependency function which should be made regular (uniform), if possible. This cannot be done with a unimodular transformation, but a loop scaling or tiling transformation can do the job.

Consider the following example of FIG. 40. By merging all i-loops, much more locality for the accesses to line[ ][ ] could be obtained. However, these loops cannot be merged because they do not have the same bounds. In PDG terms: a linear ordering vector which corresponds to merging the loops is not possible because the dependencies do not allow this. One solution is to apply loop scaling: the stride of the loops is changed from unit to non-unit, and the bounds are adjusted accordingly. Of course, this creates "holes" in the polytopes. Since mapping on programmable processors is focussed on, this will not lead to idle hardware, but only to extra if-clauses in the code. Indeed, the linear ordering vector searched for in the ordering step is only a relative and not an absolute time mapping. For the example the result in FIG. 41 is obtained.

All access functions to line[ ] are now of the form line[i+ . . . ]. This means that the dependencies are now uniform, and this makes it possible to choose a linear ordering vector which greatly increases the locality. In the corresponding code, this corresponds to applying a loop folding transformation, followed by loop merging (and inserting the necessary if-clauses) as shown in FIG. 42. Loop merging and inserting if-clauses gives FIG. 43.

Another way to solve this is strip mining (instead of loop scaling). In this case the smallest loops stay as they were, the other are strip mined to get the same loop bounds (in the outer loop) as the smallest loop. All loops have unit stride. In PDG terms, this means that we are adding dimensions to the polytopes.

For the example this gives the result of FIG. 44. Note that the inner loop which was a result of the strip mining transformation has already been unrolled here. Now choosing a linear ordering vector to increase the locality, or merging the loops, is easy again as shown in FIG. 45. The strip mining solution is "cleaner" because no holes are introduced in the polytopes, i.e. no if-clauses are needed in the code. On the other hand, it increases the dimensionality of the polytopes and thus the complexity of the search space.

The above technique can also be applied when there are more than two access functions and/or when none of the access functions is 1*i. Assume that there are N access functions, a1*i, a2*i, . . . , aN*i. When loop scaling is used, each loop X has to be scaled by a factor aX/gcd(a1, . . . , aN). When strip mining is used, each loop X has to be strip mined by a factor 1 cm(a1, . . . , aN)/aX.

These rules are intended to optimize the regularity of the dependencies between two polytopes. Intra-polytope dependencies are not taken into account, as well as the more general regularity of all dependencies. So these rules are meant to be used during the hierarchical placement, to impose constraints on the relative mapping of two polytopes.

The offset part of a dependency function (and thus of the index functions from which it is derived) does not influence the regularity of the dependencies between two polytopes. This offset part corresponds to a translation in the common iteration space. Therefore, only the linear part of the index functions is considered in the following. Note that for example loop folding is a transformation which only involves a translation.

The invented methods can be incorporated in environments for design of application, wherein at least part of the functionality of said application is obtained by mapping code on a parallel architecture.

What is to be claimed:

1. A method of transforming a first code comprising:
   loading the first code;
   loading internal processor characteristics information of the processors;
   transforming the first code into a second code in order to optimize an optimization function, that is related to data transfer and storage;
   wherein the transforming is performed globally for more than one of a plurality of non-nested loop nests; and wherein the transforming exploits the internal processor characteristics information of at least two processors.

2. The method of claim 1, wherein the first code is executable on a predetermined parallel architecture and the second code is executable on the predetermined parallel architecture, the first code and the second code describing the same functionality, the predetermined parallel architecture comprising the least two processors and at least three storage levels, at least two storage levels, being within the processors, the first code comprising at least two loop nests.

3. The method of claim 1, wherein the transforming is for a substantial subset of the loop nests.

4. The method of claim 1, wherein the transforming is for loop transformations.

5. The method of claim 1, wherein the internal processor characteristics information of the processors comprises at least the memory hierarchy information of the processors.

6. The method of claim 5, wherein the memory hierarchy information of the processors comprises at least the sizes of the memories within the processors and the bandwidth in between storage levels.

7. The method of claim 1, wherein the first code is a single assignment code.

8. The method of claim 1, wherein data-flow analysis has been applied on the first code.

9. The method of claim 1, wherein the first code comprises a set of conditional recurrence equations, which are procedurally executable.

10. The method of claim 9, wherein each of the conditional recurrence equations describe a polytope.

11. The method of claim 10, wherein the second code comprises a set of conditional recurrence equations and is procedurally executable, and each of the conditional recurrence equations is associated with an ordering vector.

12. The method of claim 1, wherein the parallel architecture is heterogeneous.

13. A method comprising:
loading first code;
loading internal processor characteristics information of the processors;
transforming the first code into a second code in order to optimize an optimization function, that is related to data transfer and storage;
wherein the transforming is for more than one of a plurality of loop nests; and
wherein the transforming exploits the internal processor characteristics information of at least two processors, and
wherein the transforming comprises:
associating with the loop nests an iterator space with operations;
determining loop nest dependencies;
grouping in a non-overlapping way the loop nest iterator spaces in one global iterator space; and
optimizing the regularity of the pattern defined by the dependencies in the global iterator space by the grouping.

14. A method comprising:
loading first code;
loading internal processor characteristics information of the processors;
transforming the first code into a second code in order to optimize an optimization function, that is related to data transfer and storage;
wherein the transforming is for more than one of a plurality of loop nests;

wherein the transforming exploits the internal processor characteristics information of at least two processors;
wherein the transforming comprises
associating with the loop nests an iterator space with operations;
determining loop nest dependency vectors; and
grouping the loop nest iterator spaces in one global iterator space,
wherein the grouping shortens the dependency vectors.

15. The method of claim 13, wherein the grouping is steered by geometric measures on the polytopes.

16. The method of claim 13, wherein the grouping optimizes an optimization function based on geometric measures on the polytopes.

17. The method of claim 13, wherein the measure of the regularity of the pattern is a statistic measure of the variance of the direction of the dependencies.

18. The method of claim 13, wherein the measure of the regularity of the pattern is based upon determining the dependencies with selected directions.

19. The method of claim 14, wherein the optimization function comprises determining at least the average dependency length of the dependencies.

20. The method of claim 14, wherein only the longest dependency of the set of dependencies related to one source signal is used.

21. The method of claim 14, wherein the optimization function comprises, at least for at least one source signal, the shortest dependency length between a consumption of the source signal and all other accesses to the source signal.

22. The method of claim 14, wherein the optimization function comprises, at least for at least one source signal, the length of the minimum spanning tree over all accesses to the source signal.

23. The method of claim 18, further comprising:
determining a dependency cone from the dependencies; and
determining the sharpness of the dependency cone, wherein the optimization function comprises at least the sharpness.

24. The method of claim 18, further comprising:
determining a dependency cone from the dependencies;
determining an allowed ordering vector cone;
determining the sharpness of the allowed ordering vector cone; and
wherein the optimization function comprises at least the sharpness.

25. The method of claim 1, further comprising:
assigning an ordering vector to the global iterator space, wherein the assigning results in optimizing an optimization function that is related to data transfer and storage; and
determining the second code which is associated with the ordering vector.

26. The method described claim 13, wherein the grouping comprises placement of the polytopes.

27. The method of claim 26, wherein the placement comprises solving an ILP program.

28. The method of claim 26, wherein the grouping comprises:
ordering the polytopes based on analysis of interpolytope dependencies; and
placing the polytopes one by one according to the polytope ordering.

29. The method of claim 1, further comprising:

assigning a processor and an execution time to each operation in the global iterator space, thereby defining a processor-time mapping, the assigning resulting in optimizing an optimization function, related to data transfer and storage;

determining the second code, which is associated with the processor-time mapping.

30. The method of claim 29, wherein a global ordering and a local ordering are each determined separately.

31. The method of claim 13, further comprising exploiting data reuse estimates while grouping.

32. The method of claim 25, further comprising exploiting data reuse estimates while assigning.

33. The method of claim 13, further comprising exploiting memory assignment estimates while grouping.

34. The method of claim 25, further comprising exploiting memory assignment estimates while assigning.

35. The method of claim 13, wherein grouping in a non-overlapping way the loop nest iterator spaces in one global iterator space comprises exploiting parallelization estimates.

36. The method of claim 25, wherein assigning an ordering vector to the global iterator space comprises exploiting parallelization estimates.

37. The method of claim 13, further comprising exploiting processor mapping estimates while grouping.

38. The method of claim 25, further comprising exploiting processor mapping estimates while assigning.

39. A device for transforming a first code:

means for inputting the first code into the device;

means for loading internal processor characteristics information of the processors into the device; and means for transforming the first code into the second code, in order to optimize an optimization function, related to data transfer and storage, the transforming taking into account at least two non-nested loop nests, and the transforming exploiting the internal processor characteristics information of the processors.

40. The device of claim 39, further comprising:

means for determining data reuse estimates, means for determining memory assignment estimates; and means for determining parallelization estimates, and means for determining processor mapping estimates.

41. The device of claim 39, wherein the device is adapted such that at least one of the codes can be represented by a set of conditional recurrence equations, which are procedurally executable.

42. The device of claim 39, wherein the device is such that the loop nests are associated with an iterator space and loop nest dependencies.

43. The device of claim 42, wherein the device is comprising being adapted such that the transformation is based upon grouping in a non-overlapping way the loop nest iterator spaces in one global iterator space.

44. The device of claim 42, further comprising means for determining the regularity of the pattern defined by the dependencies.

45. The device of claim 42, further comprising means for determining a measure of the length of the dependencies.

46. The device of claim 39, wherein the first code and second code are each executable on a predetermined parallel architecture, the first code and the second code describing the same functionality, the predetermined architecture comprising at least two processors and at least three storage levels, at least two storage levels, being within the processors, the first code comprising at least two loop nests.

47. A system for transforming code, the system comprising:

a first code comprising a plurality of non-nested loop nests, wherein the first code is executable on a predetermined parallel architecture; and a transformer for transforming and performing global optimization of at least two of the non-nested loops nests in order to optimize an optimization function that is related to data transfer and storage and wherein the transformer exploits the characteristic information of the predetermined parallel architecture.

* * * * *